US008749767B2

(12) United States Patent
Parkov et al.

(10) Patent No.: US 8,749,767 B2
(45) Date of Patent: Jun. 10, 2014

(54) SYSTEMS AND METHODS FOR DETECTING TAPE ON A DOCUMENT

(75) Inventors: Alexander Parkov, Plano, TX (US); Ronald Bruce Blair, Flower Mound, TX (US)

(73) Assignee: De La Rue North America Inc., Irving, TX (US)

( * ) Notice: Subject to any disclaimer, the term of this patent is extended or adjusted under 35 U.S.C. 154(b) by 340 days.

(21) Appl. No.: 12/872,960

(22) Filed: Aug. 31, 2010

(65) Prior Publication Data

US 2011/0052082 A1    Mar. 3, 2011

Related U.S. Application Data

(60) Provisional application No. 61/239,655, filed on Sep. 3, 2009, provisional application No. 61/239,345, filed on Sep. 2, 2009.

(51) Int. Cl.
*G01N 33/08* (2006.01)
*G06K 9/00* (2006.01)

(52) U.S. Cl.
USPC .............................. 356/57; 382/100; 382/112

(58) Field of Classification Search
None
See application file for complete search history.

(56) References Cited

U.S. PATENT DOCUMENTS

| 4,197,584 A | 4/1980 | Blazek |
| 4,525,630 A * | 6/1985 | Chapman ................... 250/559.4 |
| 4,650,319 A | 3/1987 | Stenzel et al. |
| 4,670,779 A | 6/1987 | Nagano |
| 4,922,109 A | 5/1990 | Bercovitz et al. |
| 4,935,628 A | 6/1990 | Martin et al. |
| 5,304,813 A | 4/1994 | De Man |
| 5,418,855 A | 5/1995 | Liang et al. |
| 5,498,879 A | 3/1996 | De Man |
| 5,578,813 A | 11/1996 | Allen et al. |
| 5,740,223 A | 4/1998 | Ozawa et al. |
| 5,844,682 A | 12/1998 | Kiyomoto et al. |
| 5,923,413 A | 7/1999 | Laskowski |
| 6,013,912 A | 1/2000 | Pautrat et al. |
| 6,111,261 A | 8/2000 | Bolza-Schunemann et al. |

(Continued)

FOREIGN PATENT DOCUMENTS

| CA | 2682467 A1 | 10/2008 |
| CN | 1288892 C | 12/2006 |

(Continued)

OTHER PUBLICATIONS

PCT/US2009/063146 Written Opinion of the International Searching Authority; Mailed Jun. 22, 2010; Applicant: De La Rue North America, Inc.

(Continued)

*Primary Examiner* — Jason M Repko
*Assistant Examiner* — Jhere Rowland
(74) *Attorney, Agent, or Firm* — R. Johnston Law, PLLC

(57) ABSTRACT

Systems and methods for detecting tape on a document are provided. In one embodiment, a method includes capturing a first image of a document. The first image is captured while at least a portion of the document is subjected to a first electromagnetic radiation. The method includes capturing a second image of the document. The second image is captured while at least a portion of the document is subjected to a second electromagnetic radiation. The method also includes comparing the first image to the second image to determine whether tape is adhered to the document.

19 Claims, 16 Drawing Sheets

(56) References Cited

U.S. PATENT DOCUMENTS

| | | | |
|---|---|---|---|
| 6,165,609 | A | 12/2000 | Curatolo |
| 6,178,228 | B1 | 1/2001 | Schol |
| 6,198,835 | B1 | 3/2001 | Banton et al. |
| 6,201,892 | B1 | 3/2001 | Ludlow et al. |
| 6,249,591 | B1 | 6/2001 | Tullis |
| 6,256,407 | B1 | 7/2001 | Mennie et al. |
| 6,347,163 | B2 | 2/2002 | Roustaei |
| 6,354,507 | B1 | 3/2002 | Maeda et al. |
| 6,400,470 | B1 | 6/2002 | Takaragi et al. |
| 6,405,929 | B1 * | 6/2002 | Ehrhart et al. ............ 235/486 |
| 6,477,227 | B1 | 11/2002 | Kaiser et al. |
| 6,501,825 | B2 | 12/2002 | Kaiser et al. |
| 6,563,902 | B2 | 5/2003 | Takahashi |
| 6,766,045 | B2 | 7/2004 | Slepyan et al. |
| 6,774,986 | B2 | 8/2004 | Laskowski |
| 6,819,409 | B1 | 11/2004 | Tompkin et al. |
| 6,839,128 | B2 | 1/2005 | Premjeyanth et al. |
| 6,871,606 | B2 | 3/2005 | Schweizer |
| 6,909,770 | B2 | 6/2005 | Schramm et al. |
| 6,913,260 | B2 | 7/2005 | Maier et al. |
| 6,917,040 | B2 | 7/2005 | Thierauf et al. |
| 6,918,482 | B2 | 7/2005 | Thierauf |
| 6,937,322 | B2 | 8/2005 | Gerz et al. |
| 6,962,247 | B2 | 11/2005 | Maier et al. |
| 6,970,235 | B2 | 11/2005 | Christophersen |
| 7,006,204 | B2 | 2/2006 | Coombs et al. |
| 7,030,371 | B2 | 4/2006 | Vasic et al. |
| 7,054,461 | B2 | 5/2006 | Zeller et al. |
| 7,067,824 | B2 | 6/2006 | Muller et al. |
| 7,133,124 | B2 | 11/2006 | Puttkammer |
| 7,184,133 | B2 | 2/2007 | Coombs et al. |
| 7,215,414 | B2 | 5/2007 | Ross |
| 7,218,386 | B2 | 5/2007 | Alcock et al. |
| 7,372,990 | B2 | 5/2008 | Yamauchi et al. |
| 7,487,919 | B2 | 2/2009 | Giering et al. |
| 7,529,003 | B2 | 5/2009 | Fukawa |
| 7,544,920 | B2 | 6/2009 | Kunze |
| 7,583,846 | B2 | 9/2009 | Yamauchi et al. |
| 7,599,544 | B2 | 10/2009 | Moshe |
| 7,657,112 | B2 | 2/2010 | Kuwabara |
| 7,715,613 | B2 | 5/2010 | Dobbs et al. |
| 7,737,417 | B2 | 6/2010 | Giering et al. |
| 7,864,381 | B2 | 1/2011 | Scott |
| 7,978,899 | B2 | 7/2011 | Jenrick et al. |
| 7,996,173 | B2 | 8/2011 | Schowengerdt et al. |
| 8,004,725 | B2 | 8/2011 | Schnitzlein |
| 8,125,624 | B2 | 2/2012 | Jones et al. |
| 8,184,852 | B2 | 5/2012 | Hofman et al. |
| 8,225,989 | B1 | 7/2012 | Turocy et al. |
| 8,229,821 | B2 | 7/2012 | Mennie et al. |
| 8,265,346 | B2 | 9/2012 | Blair |
| 8,290,216 | B1 | 10/2012 | Blair |
| 8,306,259 | B2 | 11/2012 | Wiersma |
| 8,433,124 | B2 | 4/2013 | Blair et al. |
| 8,509,492 | B2 | 8/2013 | Blair |
| 8,542,094 | B2 | 9/2013 | Talwerdi |
| 2001/0041015 | A1 * | 11/2001 | Chui .............................. 382/240 |
| 2002/0097833 | A1 | 7/2002 | Kaiser et al. |
| 2002/0105654 | A1 | 8/2002 | Goltsos |
| 2003/0030785 | A1 | 2/2003 | Christophersen |
| 2003/0174878 | A1 | 9/2003 | Levin |
| 2004/0051862 | A1 | 3/2004 | Alcock et al. |
| 2004/0101211 | A1 | 5/2004 | Brugger et al. |
| 2004/0208373 | A1 | 10/2004 | Aoki et al. |
| 2005/0078851 | A1 | 4/2005 | Jones et al. |
| 2005/0129282 | A1 | 6/2005 | O'Doherty et al. |
| 2005/0178841 | A1 | 8/2005 | Jones et al. |
| 2006/0072123 | A1 | 4/2006 | Wilson et al. |
| 2006/0115139 | A1 | 6/2006 | Joshi et al. |
| 2006/0159329 | A1 * | 7/2006 | Joshi et al. ..................... 382/135 |
| 2006/0249951 | A1 * | 11/2006 | Cruikshank et al. ............ 283/92 |
| 2007/0119950 | A1 | 5/2007 | Auslander et al. |
| 2007/0119951 | A1 | 5/2007 | Auslander et al. |
| 2007/0165208 | A1 | 7/2007 | Cowburn et al. |
| 2007/0182951 | A1 | 8/2007 | Wunderer et al. |
| 2007/0216976 | A1 | 9/2007 | Endo et al. |
| 2008/0054545 | A1 | 3/2008 | Calverley et al. |
| 2008/0116628 | A1 | 5/2008 | Edwards et al. |
| 2008/0123081 | A1 | 5/2008 | Stein et al. |
| 2008/0159587 | A1 | 7/2008 | Rhoads |
| 2008/0192992 | A1 | 8/2008 | Moshe |
| 2009/0153926 | A1 | 6/2009 | Wiltshire et al. |
| 2009/0310126 | A1 * | 12/2009 | Klock et al. .................... 356/51 |
| 2010/0073128 | A1 | 3/2010 | Talwerdi |
| 2010/0104170 | A1 | 4/2010 | Joshi et al. |
| 2010/0128964 | A1 | 5/2010 | Blair |
| 2010/0128965 | A1 | 5/2010 | Blair |
| 2010/0157280 | A1 | 6/2010 | Kusevic et al. |
| 2011/0090485 | A1 | 4/2011 | Cronin et al. |

FOREIGN PATENT DOCUMENTS

| | | |
|---|---|---|
| CN | 1950857 A | 4/2007 |
| DE | 102004035494 A1 | 2/2006 |
| EP | 1049055 A2 | 11/2000 |
| EP | 1117060 A1 | 7/2001 |
| EP | 1246876 A2 | 10/2002 |
| EP | 1429297 A1 | 6/2004 |
| EP | 1250682 B1 | 8/2005 |
| EP | 2166515 A1 | 3/2010 |
| EP | 2453382 A2 | 5/2012 |
| JP | 10-116369 | 5/1998 |
| JP | 2001236178 A | 8/2001 |
| JP | 2003-272022 | 9/2003 |
| JP | 2006-053736 | 2/2006 |
| JP | 2006053736 A | 2/2006 |
| KR | 1020010090049 | 10/2001 |
| KR | 20060131966 A | 12/2006 |
| KR | 1020080094426 | 10/2008 |
| WO | WO-02068945 A1 | 9/2002 |
| WO | WO-03063096 A1 | 7/2003 |
| WO | WO-2004052059 A2 | 6/2004 |
| WO | WO-2004104947 A2 | 12/2004 |
| WO | WO-2004104948 A1 | 12/2004 |
| WO | WO-2005086100 A1 | 9/2005 |
| WO | WO-2005100926 A1 | 10/2005 |
| WO | WO-2007025740 A1 | 3/2007 |
| WO | WO-2008120357 A1 | 10/2008 |
| WO | PCT/US10/047485 | 5/2011 |

OTHER PUBLICATIONS

PCT/US2009/063148 Written Opinion of the International Searching Authority; Mailed Jun. 22, 2010; Applicant: De La Rue North America, Inc.

U.S. Appl. No. 12/277,936; Non-Final Office Action dated Jul. 20, 2011; First Named Inventor: Ronald Bruce Blair.

U.S. Appl. No. 12/277,936; Final Office Action dated Dec. 20, 2011; First Named Inventor: Ronald Bruce Blair.

U.S. Appl. No. 12/323,109; Notice of Allowance dated Dec. 1, 2011; First Named Inventor: Ronald Bruce Blair.

U.S. Appl. No. 12/683,932, Blair.

U.S. Appl. No. 12/683,932; Final Office Action dated Sep. 19, 2012; First Named Inventor: Ronald Bruce Blair.

U.S. Appl. No. 13/539,155; Notice of Allowance dated Aug. 31, 2012; First Named Inventor: Ronald Bruce Blair.

U.S. Appl. No. 12/277,936; Non-Final Office Action dated May 22, 2012; First Named Inventor: Ronald Bruce Blair.

U.S. Appl. No. 12/323,109; Notice of Allowance dated Mar. 21, 2012; First Named Inventor: Ronald Bruce Blair.

U.S. Appl. No. 12/683,932; Non-Final Office Action dated May 22, 2012; First Named Inventor: Ronald Bruce Blair.

European Search Report date mailed Dec. 4, 2012; European Application No. 09830805.9.

European Search Report date mailed Dec. 4, 2012; European Application No. 09830806.7.

Chinese Office Action date mailed Mar. 20, 2013; Chinese Application No. 200980147132.4.

Response filed Aug. 22, 2012 for U.S. Appl. No. 12/277,936.

Final Office Action date mailed Oct. 22, 2012 for U.S. Appl. No. 12/277,936.

(56) References Cited

OTHER PUBLICATIONS

RCE/Response filed Feb. 19, 2013 for U.S. Appl. No. 12/277,936.
RCE filed Jun. 19, 2012 for U.S. Appl. No. 12/323,109.
Notice of Allowance date mailed Jul. 12, 2012 for U.S. Appl. No. 12/323,109.
Non-Final Office Action date mailed Mar. 5, 2013 for U.S. Appl. No. 13/609,040.
RCE/Response filed Dec. 18, 2012 for U.S. Appl. No. 12/683,932.
Non-Final office Action date mailed Sep. 10, 2012 for U.S. Appl. No. 12/984,476.
Response filed Dec. 10, 2012 for U.S. Appl. No. 12/984,476.
Notice of Allowance date mailed Jan. 9, 2013 for U.S. Appl. No. 12/984,476.
Chinese Office Action date mailed Mar. 1, 2013; Chinese Application No. 200980146901.9.
Notice of Allowance date mailed Apr. 15, 2013 for U.S. Appl. No. 12/683,932.
Non-Final Office Action date mailed Jul. 31, 2013 for U.S. Appl. No. 12/277,936.
Response filed Jun. 13, 2013 for U.S. Appl. No. 13/609,040.
Notice of Allowance date mailed Jul. 1, 2013 for U.S. Appl. No. 13/609,040.
International Search Report and Written Opinion date mailed Jul. 26, 2013; PCT Application No. PCT/US2011/020273.
Final Office Action date mailed Dec. 19, 2013; U.S. Appl. No. 12/277,936.
Non-Final Office Action date mailed Nov. 27, 2013; U.S. Appl. No. 13/609,040.
Response filed Dec. 13, 2013; U.S. Appl. No. 13/609,040.
Non-Final Office Action date mailed Dec. 26, 2013; U.S. Appl. No. 14/045,959.
International Search Report and Written Opinion date mailed Nov. 22, 2013; PCT International Application No. PCT/US13/41581.

\* cited by examiner

| | WHITE LIGHT | SPECULAR REFLECTED WHITE LIGHT | ULTRAVIOLET LIGHT |
|---|---|---|---|
| LINE 1 | 255 | 0 | 0 |
| LINE 2 | 0 | 255 | 0 |
| LINE 3 | 0 | 0 | 255 |

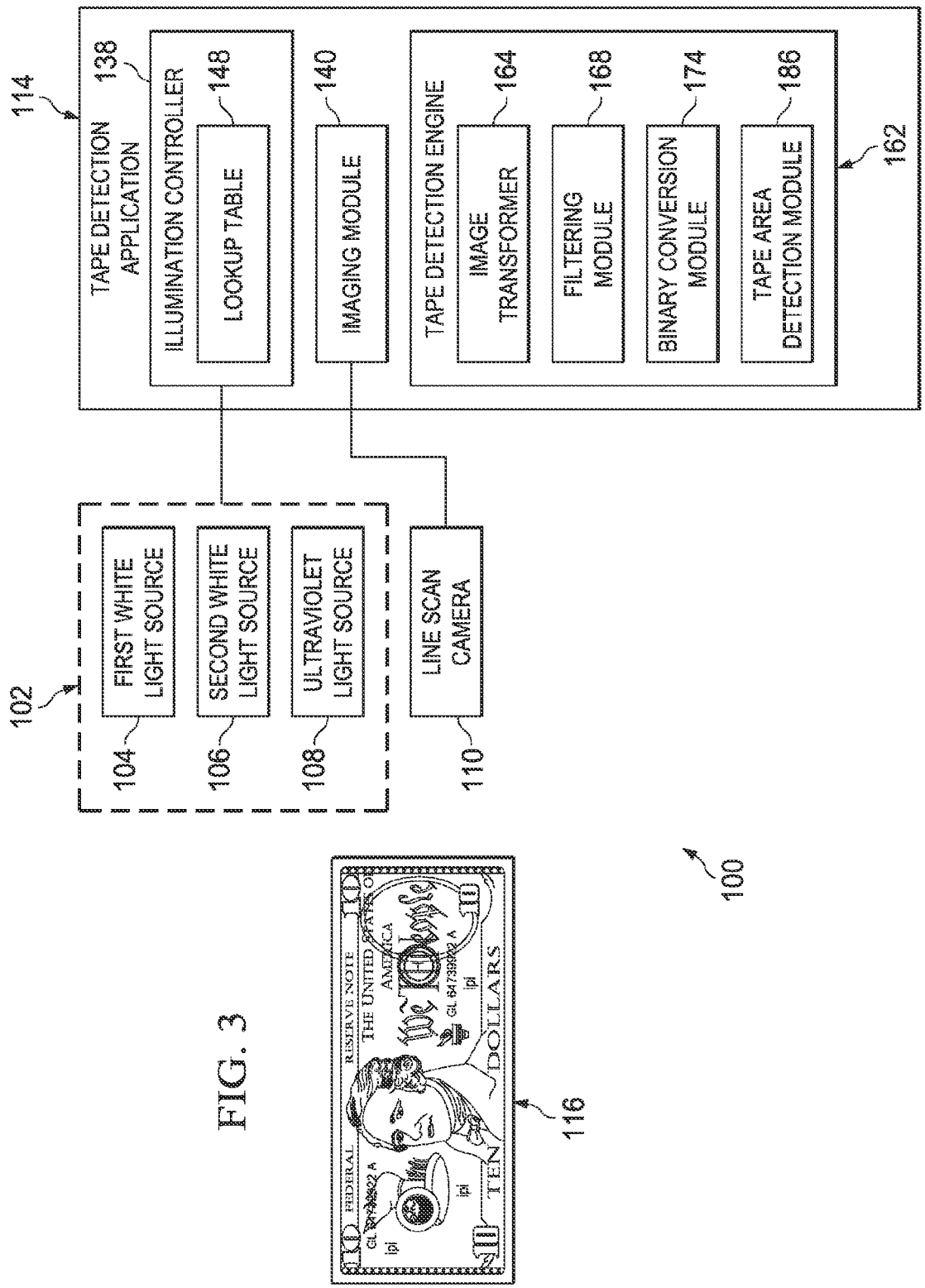

SYSTEMS AND METHODS FOR DETECTING TAPE ON A DOCUMENT

CROSS-REFERENCE TO RELATED APPLICATIONS

This application claims the benefit of U.S. Provisional Application No. 61/239,345 filed Sep. 2, 2009 and U.S. Provisional Application No. 61/239,655 filed Sep. 3, 2009, all of which are hereby incorporated by reference.

TECHNICAL FIELD

The illustrative embodiments relate generally to adhesive detection, and more particularly, to detecting tape on a document.

BACKGROUND

Over time, documents, such as banknotes (e.g., paper money), checks, legal-related documents, and other document types, can deteriorate. For example, banknotes may suffer tears as a result of changing hands multiple times in financial transactions. At times, tape may be applied to banknotes and other documents to repair tears or for other reasons. In addition, documents containing excessive amounts of tape sometimes need to be destroyed, repaired, or identified so that document quality can be maintained or improved. For example, banknotes on which tape has been used to repair tears may need to be removed from circulation to maintain banknote quality. However, current systems fail to reliably and efficiently detect tape (e.g., transparent tape, shiny tape, matte tape, thin tape, adhesive paper, etc.) on documents, often requiring tape detection to be performed manually by visual inspection or using other non-desirable methods.

SUMMARY

According to an illustrative embodiment, a method for detecting tape on a document includes capturing a first image of a document. The first image is captured while at least a portion of the document is subjected to a first electromagnetic radiation. The method includes capturing a second image of the document. The second image is captured while at least a portion of the document is subjected to a second electromagnetic radiation. The method also includes comparing the first image to the second image to determine whether tape is adhered to the document.

According to another illustrative embodiment, a method for detecting tape on a document includes moving a document along a predetermined path, capturing a first image of the document in response to subjecting at least a portion of the document to a first electromagnetic radiation, capturing a second image of the document in response to subjecting at least a portion of the document to a second electromagnetic radiation, and comparing the first image to the second image to form a transformed image. The transformed image is associated with a set of intensity values. The method also includes determining whether the document includes at least a minimum threshold amount of tape using the intensity values of the transformed image.

According to another illustrative embodiment, an apparatus for detecting tape on a document includes a first electromagnetic radiation source to emit a first electromagnetic radiation toward a document, a second electromagnetic radiation source to emit a second electromagnetic radiation toward the document, and an imaging device to capture a first image and a second image of the document. Each of the first image and the second image is captured while electromagnetic radiation from at least one of the first electromagnetic radiation source or the second electromagnetic radiation source is emitted toward the document. The apparatus also includes a controller to compare the first image to the second image to determine whether tape is present on the document.

BRIEF DESCRIPTION OF THE DRAWINGS

FIG. 3 is a schematic, block diagram of a tape detection system according to an illustrative embodiment;

DETAILED DESCRIPTION

Figure 1:
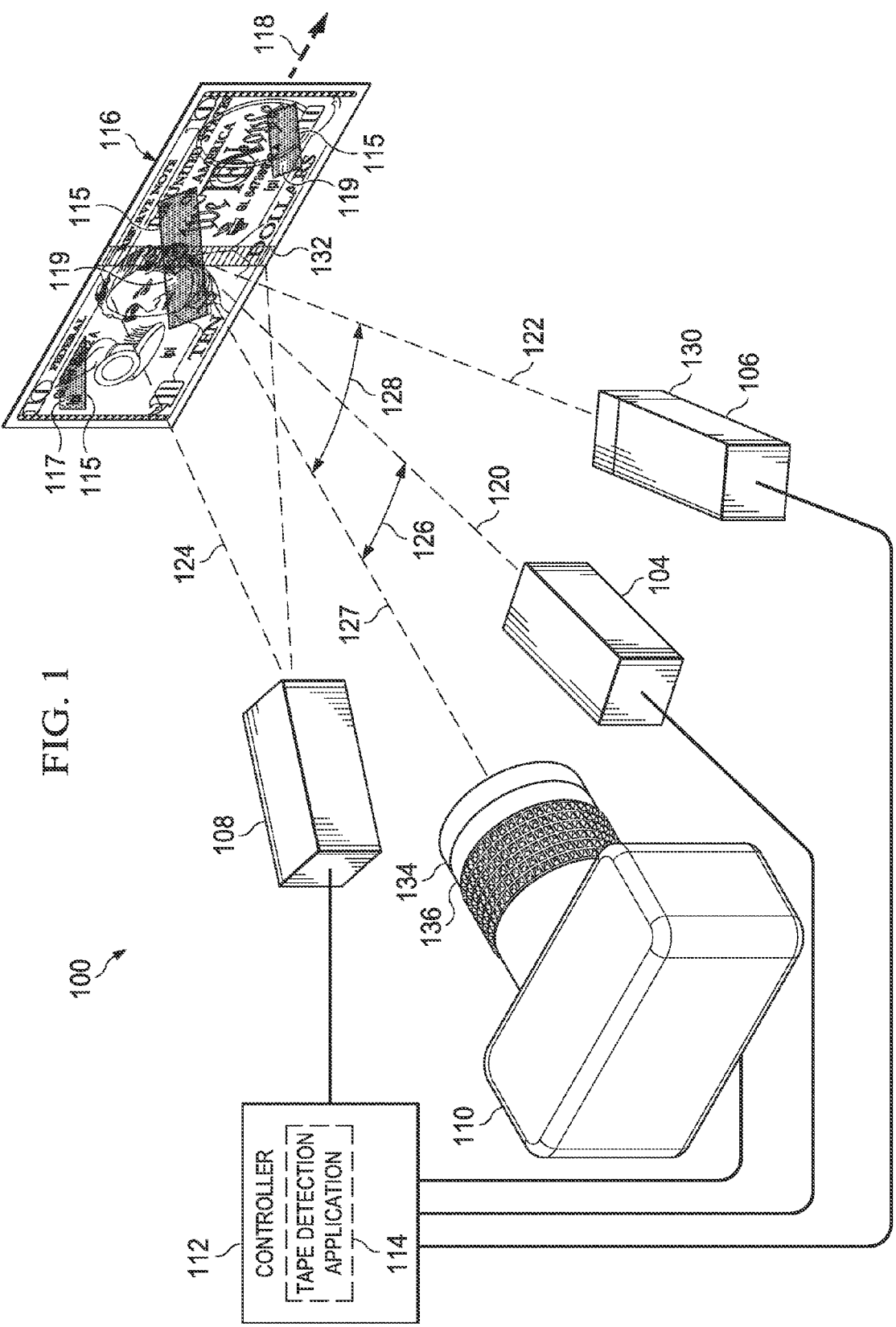
FIG. 1 is a schematic, pictorial representation of a tape detection system according to an illustrative embodiment.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Referring to FIGS. 1 through 9, an illustrative embodiment of a tape detection system 100 includes two or more light, or electromagnetic radiation, sources 102, and an image sensor 110. In one embodiment, the image sensor 110 captures two or more images of a document 116 while the document 116 is subjected to electromagnetic radiation from any of the light sources 102. The controller 112, on which a tape detection application 114 may be implemented, compares the captured images of the document 116 to determine whether tape 115 is present on the document 116. In comparing the images of the document 116, the controller 112 may create a transformed image that is used to determine whether the tape 115 is present on the document 116.

In another illustrative embodiment, the light sources 102 include a first white light source 104, a second white light source 106, and an ultraviolet light source 108, and the imaging device 110 is a line scan camera. The light sources 102 may illuminate the document 116 according to a predetermined sequence so that line images illuminated by the different light sources 102 may be captured by the imaging device 110 and further processed by the controller 112, as described in further detail below, to determine whether tape 115 is present on the document 116.

While the tape detection system 100 may be used to detect tape 115 on any type of document, the document 116 shown in FIG. 1 is a banknote. Indeed, the document 116 may be a banknote from any country of origin. Other types of documents 116 for which tape 115 may be detected by the tape detection system 100 include financial documents (e.g., checks, money orders, travelers checks, etc.), legal-related documents, or any other type of document on which tape 115 may be present. In one non-limiting example, the document 116 may be formed from ultraviolet dull paper or polymer substrate. Unless otherwise indicated, as used herein, "or" does not require mutual exclusivity. Also, the tape 115 may be any type of tape or adhesive. For example, the tape 115 may be transparent tape, shiny tape, matte tape, thin tape, glue, etc. While FIG. 1 shows the tape 115 to be clearly distinguishable from the document 116, in one embodiment, the tape 115 may be barely detectable, if at all, by visual inspection by an observer. In the non-limiting example shown in FIG. 1, the tape 115 includes a piece of shiny, or reflective, tape 117, while the remainder of the tape 115 is matte tape 119 that includes fluorescents.

Any number of light sources, of any type, may be used in the tape detection system 100. The light sources 102 may emit any type of light (e.g., ultraviolet, infrared, white, red, green, blue, X-ray, etc.) or other suitable electromagnetic radiation. In the illustrative embodiment of FIG. 1, the tape detection system 100 has three light sources. The ultraviolet light source 108 emits ultraviolet light toward the document 116 as directed by the controller 112, and is capable of illuminating at least a portion of the document 116 with ultraviolet light. The first and second white light sources 104 and 106 emit white light toward the document 116 as directed by the controller 112, and may illuminate at least a portion of the document 116 with white light.

The first white light source 104, the second white light source 106, and the ultraviolet light source 108 each has its own respective line of sight 120, 122, and 124. As seen from FIG. 1, each light source 102 illuminates the document 116 at a different angle. For example, the first white light source 104 illuminates the document 116 more directly than the second white light source 106. Thus, the line of sight 120 of the first white light source 104 more closely approximates a perpendicular orientation to the face of the document 116 than the line of sight 122 of the second white light source 106.

In one embodiment, the angle 126 formed by the line of sight 120 of the first white light source 104 and a line of sight 127 of the imaging device 110 is less than the angle 128 formed by the line of sight 122 of the second white light source 106 and the line of sight 127 of the imaging device 110. In one embodiment, the angle 128 may be between 1 and 90 degrees (e.g., 30, 45, 60, 90, etc.), and the angle 126, which is less than the angle 128, may be between 0 and 89 degrees (e.g., 0, 30, 45, 60, etc.). In another embodiment, the line of sight 120 may bisect, or approximately bisect, the angle 128. In the angular configuration shown in FIG. 1, the first white light source 104 may be considered to directly, or semi-directly, illuminate the document 116, while the second white light source 106 may cause specular reflection of the white light from the document 116. In the embodiment of FIG. 1, the specular reflected white light originating from the second white light source 106 may be used by the controller 112 for image processing and tape detection, as described below. For example, the specular reflected white light may be useful in detecting the shiny tape 117, which has a more reflective surface than the matte tape 119. In other embodiments, the orientation, including the angles by which the light sources 102 illuminate the document 116, may vary. In an alternate embodiment, the angle 126 may be greater than the angle 128.

Also, the lines of sight 120, 122, 124, and 127 are schematic examples for illustration purposes only; in one embodiment, the light emitted by light sources 104, 106, and 108 is spread vertically so as to illuminate a portion of the document 116 (e.g., the portion covered by the line image 132, a portion reaching from top edge of the document 116 to the bottom edge, etc.). This has been shown for the line of sight 124 for the ultraviolet light source 108, but may apply to any of the light sources 104, 106, and 108. Such a vertically spread line of sight may also apply to the imaging device 110, although the imaging device 110 captures line images instead of emitting light along its respective line of sight 127.

The specific technique or components used to emit light from the light sources 102 may vary, and may include light-emitting diodes (LEDs), light bulbs, etc. Also, the white light emitted from the first and second white light sources 104, 106 may originate from a white LED, simultaneous red, green, and blue LEDs, or other light emission configurations. Because the document 116 moves along a path 118 as the light sources 102 activate and deactivate in a sequential manner, different portions of the document 116 may be selectively illuminated as the document moves along the path 118.

In one embodiment, a diffuser 130, such as a holographic diffuser, may be positioned in the line of sight 122 of the second white light source 106. The diffuser 130 causes diffusion of the light emitted from the second white light source 106. In one example, the diffuser 130 may be used to avoid imaging individual LED dyes, color, or radiation reflected off of the shiny tape 117. Also, in the case of, e.g., a fiber-optics based illuminator, the diffuser 130 may be used to widen the illumination or specular reflection area to accommodate varying reflection angles due to the document 116 or the tape 115 not being flat. The diffuser 130 may be used for any combination of the light sources 102, or none at all.

In one embodiment, the imaging device 110 may capture line images 131, such as line image 132, from the document 116. In the embodiment in which the imaging device 110 is a line scan camera, the line scan camera may be any camera that can capture line images of a document. The line images 131 captured by the imaging device 110 may have any width (e.g., one pixel wide, ten pixels wide, or any other width as measured in any unit). The line images 131 may be captured while light from one of the light sources 102 is emitted toward the document 116 to illuminate the portion of the document 116 at which the line image is captured. Also, the imaging device 110 may capture the line images 131 at any orientation or angle relative to the document 116 depending upon the embodiment employed. Furthermore, it will be appreciated that while a line scan camera is employed in some of the illustrative embodiments, any suitable imaging device capable of capturing any suitable image (frame, line, or otherwise) of a document may be employed and remain within the scope of the present disclosure. For example, and without limitation, the imaging device 110 may be a TDI camera, a frame camera, an x-ray imaging device, etc.

In one embodiment, the imaging device 110 captures the line images 131 in greyscale. The greyscale line images may be used to measure the intensity of light reflection from the surface of the document 116. However, it will be appreciated that images may be captured at any suitable pixel color or bit depth and remain within the scope of the present disclosure.

In one embodiment, a blocking filter 134 may be positioned adjacent the lens 136 of the imaging device 110, or otherwise positioned in the line of sight 127 of the imaging device 110. In one embodiment, the blocking filter 134 is an ultraviolet light blocking filter. The ultraviolet light blocking filter may have any cut wavelength, which may depend, e.g., on the wavelength of the ultraviolet light emitted from the ultraviolet light source 108. For example, if the wavelength of ultraviolet light emitted from the ultraviolet light source 108 is 390 nanometers, then the ultraviolet light blocking filter may be a ~400 to ~430 nanometer ultraviolet light blocking filter. In another example, if the wavelength of ultraviolet light emitted from the ultraviolet light source 108 is 365 nanometers, then the ultraviolet light blocking filter may be a ~380 to ~430 nanometer ultraviolet light blocking filter. However, any cut wavelength may be used for the ultraviolet light blocking filter for any light source. It will be further appreciated that any electromagnetic filtering device may be employed and remain within the scope of the present disclosure. By way of non-limiting example, when three light sources are used, as shown in FIG. 1, the ultraviolet light blocking filter may be a 400 to 415 nanometer ultraviolet light blocking filter. When the ultraviolet light blocking filter is used while capturing an ultraviolet light illuminated line image, the ultraviolet light blocking filter may allow the passage of all or a portion of visible light emitted from the document 116 as a result of the fluorescent excitation of the tape 115. Such fluorescent excitation may occur, for example, when ultraviolet light strikes matte tape 119, which can contain fluorescent characteristics.

The controller 112, which implements the tape detection application 114, may be any computing or data processing device. The controller 112, in conjunction with the tape detection application 114, may control the light sources 102 and the imaging device 110 to implement the illustrative embodiments.

The tape detection application 114 includes an illumination controller 138 that controls the light sources 102 by activating and deactivating each of the light sources 102 according to a predetermined sequence. The illumination controller 138 may operate in conjunction with an imaging module 140, which controls the imaging device 110 to capture the line images 131 of the document 116 as the light sources 102 illuminate the document 116 according to the predetermined sequence.

Figures 2, 4:
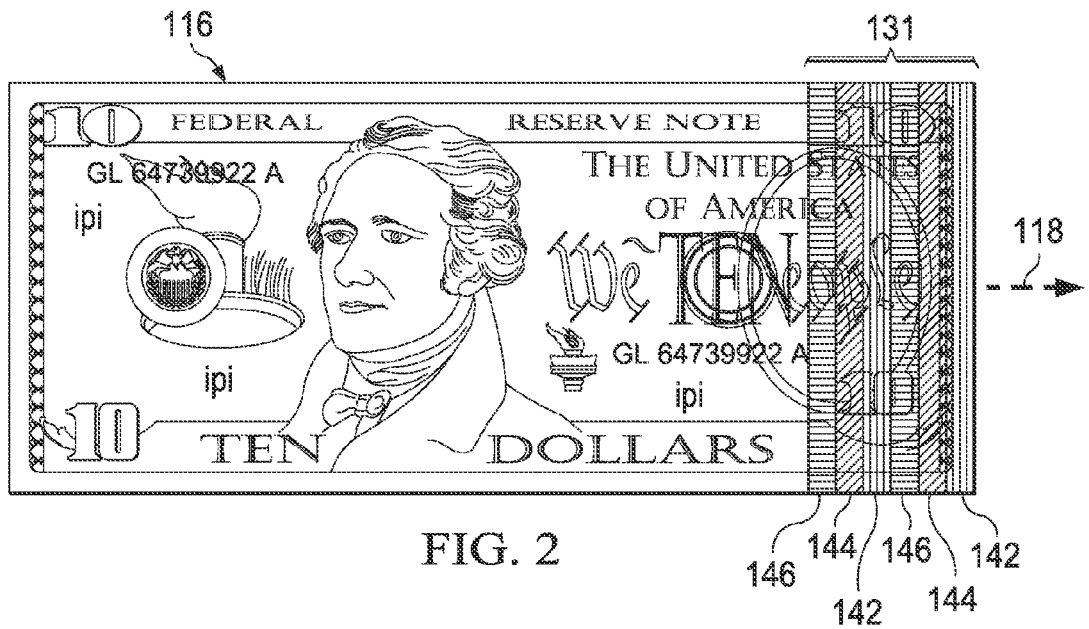
FIG. 2 is a schematic, pictorial representation of a banknote being processed by the tape detection system in FIG. 1 according to an illustrative embodiment.
FIG. 4 is a schematic representation of a lookup table according to an illustrative embodiment.

With reference to FIGS. 1 and 2, in one embodiment the illumination controller 138 may command the first white light source 104 to illuminate a portion of the document 116 with direct, or semi-direct, white light, while the imaging module 140 commands the imaging device 110 to capture a first white light illuminated line image 142 within the portion of the document 116 illuminated by the first white light source 104. Next, the illumination controller 138 may command the second white light source 106 to illuminate a portion of the document 116 with white light that is specularly reflected from the document 116, while the imaging module 140 commands the imaging device 110 to capture a second white light illuminated line image 144 within the portion of the document 116 illuminated by the second white light source 106. In one embodiment, the portions of the document 116 that are illuminated by each light source 102 may overlap as the document 116 moves along the path 118. However, the line images 131 captured by the imaging device 110 may have little or no overlap such that each line image 131 captures a different line portion of the document 116. After the second white light illuminated line image 144 is captured, the illumination controller 138 may command the ultraviolet light source 108 to illuminate a portion of the document 116 with ultraviolet light while the imaging module 140 commands the imaging device 110 to capture an ultraviolet light illuminated line image 146 at the portion of the document 116 illuminated with ultraviolet light. This process of illuminating the document 116 according to a predetermined sequence and capturing line images 131 from the illuminated portions of the document 116 may continue for a or a portion of the document 116 so that multiple first white light illuminated line images 142, multiple second white light illuminated line images 144, and multiple ultraviolet light illuminated line images 146 are captured for the document 116, as illustrated in FIG. 2.

In the non-limiting example given above, the sequence of illumination is such that the first white light illuminated line image 142 is captured first, the second white light illuminated line image 144 is captured second, and the ultraviolet light illuminated line image 146 is captured third; this example sequence may be repeated along the length of the document 116. However, this X, Y, Z, X, Y, Z, . . . sequence may be used to illuminate the document 116 in any order, and any of the light sources 102 may be activated at any slot (X, Y, or Z) in the sequence. For example, in the X, Y, Z, X, Y, Z, . . . sequence, X may be first white light, Y may be second white light, and Z may be ultraviolet light. The sequence may also vary, and include variations such as XX, Y, ZZZ, X, etc. . . . , Z, YY, X, Z, YY, X, etc., or any other combination or sequence. Also, any number of light sources 102 may be included in the sequence. For example, if the tape detection system 100 includes two light sources, then the two light sources may alternatingly illuminate the document 116 in an X, Y, X, Y, . . . sequence such that the respective line images for each of the two light sources alternate along a length of the document 116. Other methods of illuminating or capturing the line images 131 may also be employed, which may or may not use a sequenced illumination pattern.

In one embodiment, the illumination controller 138 accesses a lookup table 148, shown in FIGS. 3 and 4, to determine which of the light sources 102 with which to illuminate the document 116 at a particular time. The lookup table 148 indicates the intensity at which each type of light should be emitted for each of the line images 131 captured by the imaging device 110. The "white light" shown in the lookup table 148 may correspond to the white light emitted from the first white light source 104, the "specular reflected white light" may correspond to the white light emitted from the second white light source 106, and the "ultraviolet light" may correspond to the ultraviolet light emitted from the ultraviolet light source 108. In the example of FIG. 4, an intensity scale of 0 to 255 is employed to control the intensity of each type of light. Though intensities of 0 and 255 are shown in the lookup table 148, which correspond to no light or full-intensity light, respectively, any intensity in the range may be used. Furthermore, any intensity measurement or standard may be used by the lookup table 148 to control the intensity of light emitted toward the document 116.

When the illumination controller 138 uses the example lookup table 148 in FIG. 4, the illumination controller 138 commands the first white light source 104 to emit white light at full intensity when the imaging device 110 captures a first line image of the document 116. Next, the illumination controller 138 commands the second white light source 106 to emit white light (to be specularly reflected) at full intensity when the imaging device 110 captures a second line image of the document 116. Next, the illumination controller 138 commands the ultraviolet light source 108 to emit ultraviolet light at full intensity while the imaging device 110 captures a third line image from the document 116. This sequence of illumination, or any other sequence, may be the result of the illumination controller 138 accessing the lookup table 148, or any other suitable lookup table, for instructions as to how to illuminate the document 116. The illumination sequence for lines 1 through 3, as indicated by the lookup table 148, may be changed as desired. In another embodiment, the emission of white light may be caused by the lookup table 148 directing the illumination controller 138 to simultaneously illuminate red, green, and blue light sources to create white light.

Figure 5:
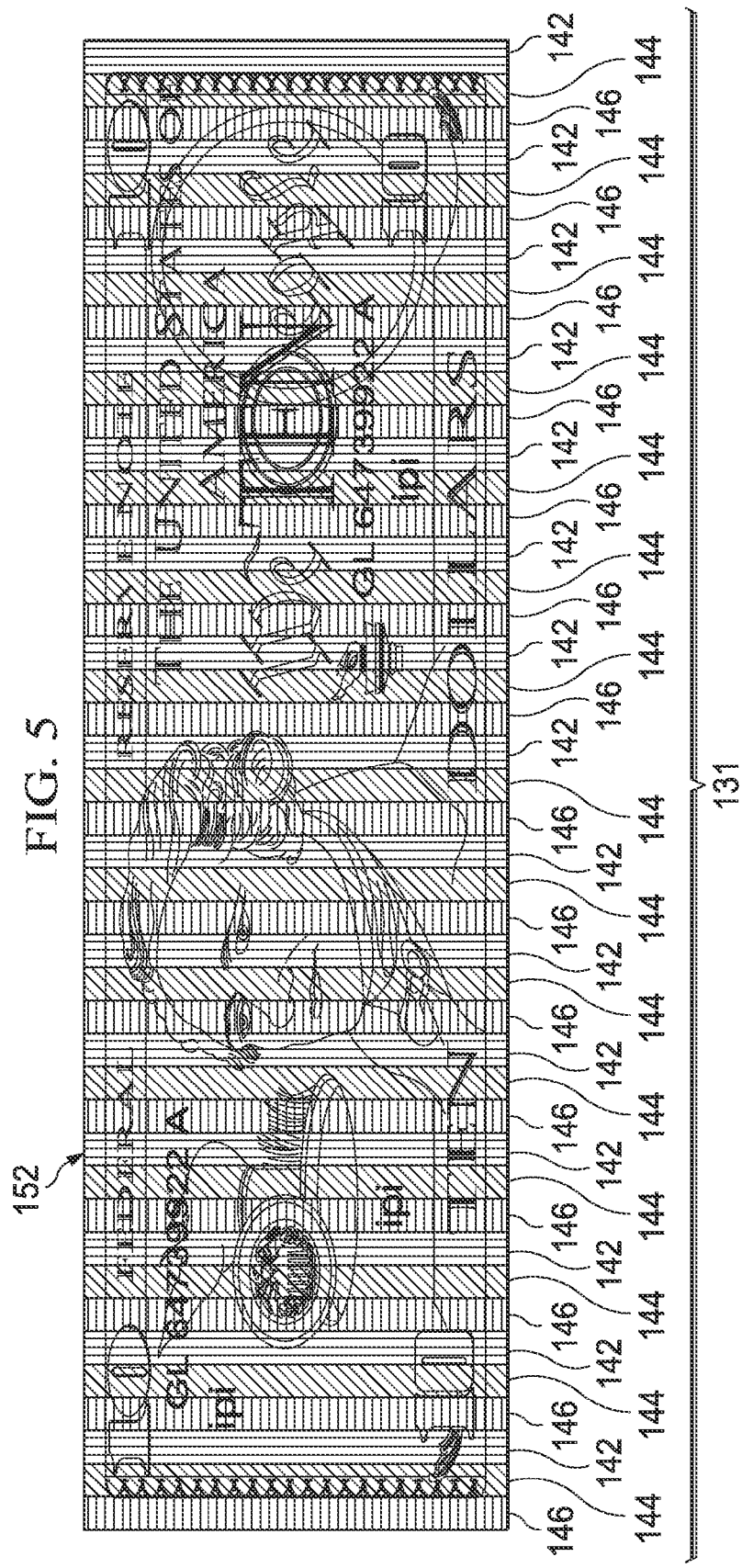
FIG. 5 is a schematic, pictorial representation of an interleaved image of the document shown in FIG. 1 according to an illustrative embodiment.

In the illustrative embodiment shown in FIG. 5, line images 131 are captured along substantially the entire length of the document 116 such that an interleaved image 152 is formed from the first white light illuminated line images 142, the second white light illuminated line images 144, and the ultraviolet light illuminated line images 146. The elongation of the interleaved image 152, as compared to the document 116, may be attributed to the rate of image sampling of the document 116. In one embodiment, the imaging module 140 may aggregate, or combine, the first white light illuminated line images 142, the second white light illuminated line images 144, and the ultraviolet light illuminated line images 146 to form the interleaved image 152.

The imaging module 140 may then separate the interleaved image 152 into two or more images based on the number of light sources 102 used to create the interleaved image 152. For example, the imaging module 140 may separate the interleaved image 152 into a direct, or semi-direct, white light illumination image 154 (shown in FIG. 6A), a specular reflected white light illumination image 156 (shown in FIG. 6B), and an ultraviolet light illumination image 158 (shown in FIG. 6C). The white light illumination image 154 is formed from the first white light illuminated line images 142, the specular reflected white light illumination image 156 is formed from the second white light illuminated line images 144, and the ultraviolet light illumination image 158 is formed from the ultraviolet light illuminated line images 146. In the example of FIG. 6B, for the specular reflected white light illumination image 156, the shiny piece 117 of the tape 115 (shown as image portion 157) is more distinguishable than the remainder of the tape 115 due to specular reflection off the surface of the shiny tape 117. In the example of FIG. 6C, the ultraviolet light illumination image 158 better distinguishes the matte pieces 119 of the tape 115 (shown as image portions 159) than the white light illumination images 154, 156; this may be caused if the matte tape 119 has fluorescent characteristics, and emits, or fluoresces, visible light when illuminated by ultraviolet light. In the embodiment that uses the blocking filter 134, this visible light showing the fluorescence of the tape 115 may be allowed to pass through the lens 136 of the imaging device 110 while all or a portion of the ultraviolet light reflected from the document 116 is blocked.

Figure 6A:
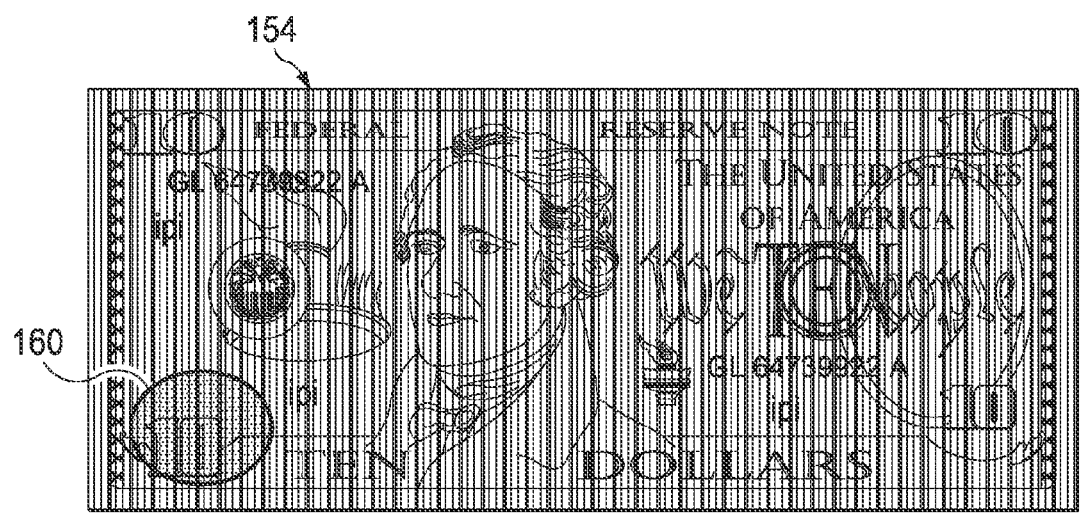
FIG. 6A is a schematic, pictorial representation of a first white light illumination image formed using the interleaved image in FIG. 5 according to an illustrative embodiment.
Figure 6B:
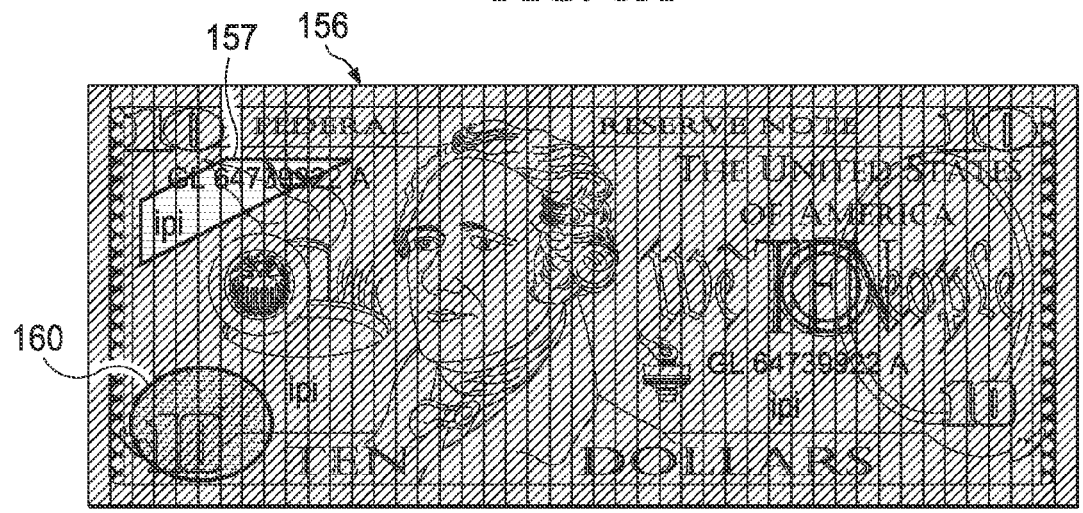
FIG. 6B is a schematic, pictorial representation of a second white light illumination image formed using the interleaved image in FIG. 5 according to an illustrative embodiment.
Figure 6C:
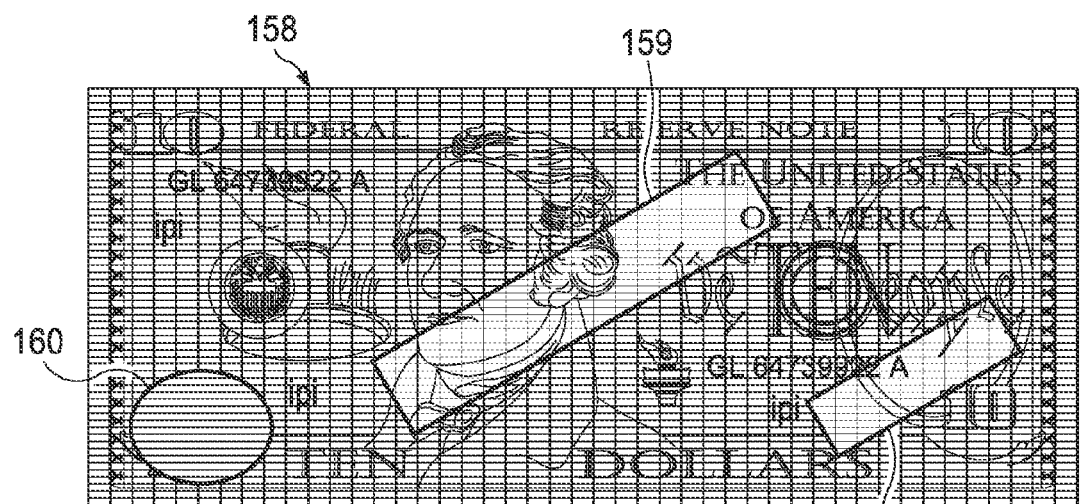
FIG. 6C is a schematic, pictorial representation of an ultraviolet light illumination image formed using the interleaved image in FIG. 5 according to an illustrative embodiment.

In the example of FIGS. 6A-C, a document feature 160 can be distinguished in the three illumination images 154, 156, 158. The feature 160 is particularly visible in the ultraviolet light illumination image 158, which shows the feature 160 as occupying substantially white space. The feature 160 may be an integral part of the document 116, such as a hologram, security thread, foil, such as optically variable foil, or any other reflective or embeddable features. As described in further detail below, the area of the feature 160 may be taken into account when determining whether the tape 115 is present on the document 116. The inclusion of the feature 160 is by way of example only, and, in other embodiments, no feature, such as feature 160, may be included on the document 116 at all.

In one embodiment, the imaging module 140 may perform flat field calibration, or correction, on one or more of the illumination images 154, 156, 158. In one embodiment, only the white light illumination images 154, 156 are flat field corrected, and the ultraviolet light illumination image 158 may be corrected for dark signal non-uniformity (DSNU), a parameter of fixed pattern noise (FPN). Other suitable corrective techniques may be employed and remain within the scope of the present disclosure.

Figure 7:
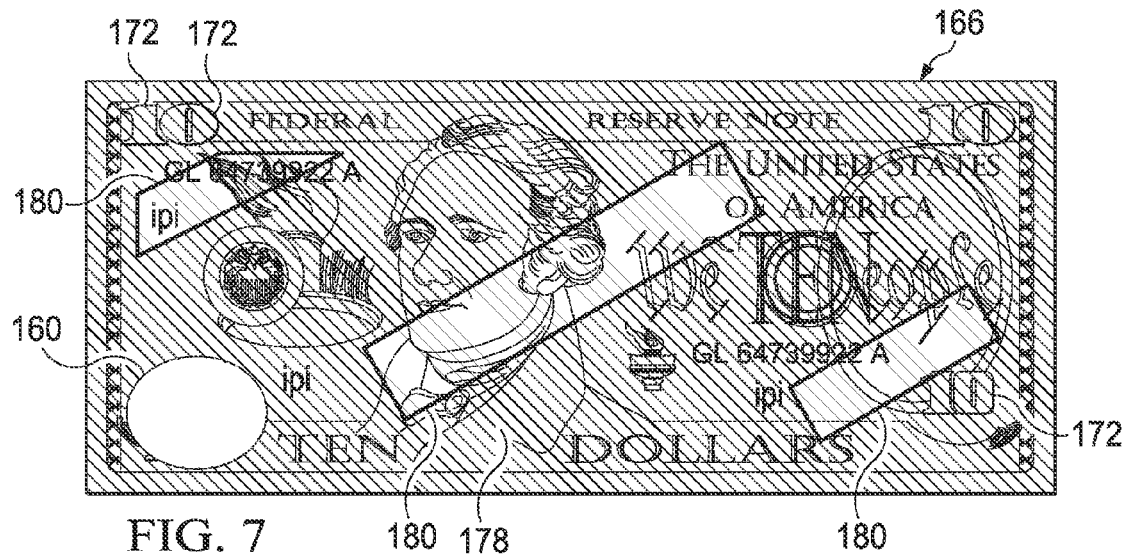
FIG. 7 is a schematic, pictorial representation of a transformed image according to an illustrative embodiment.
Figure 8:
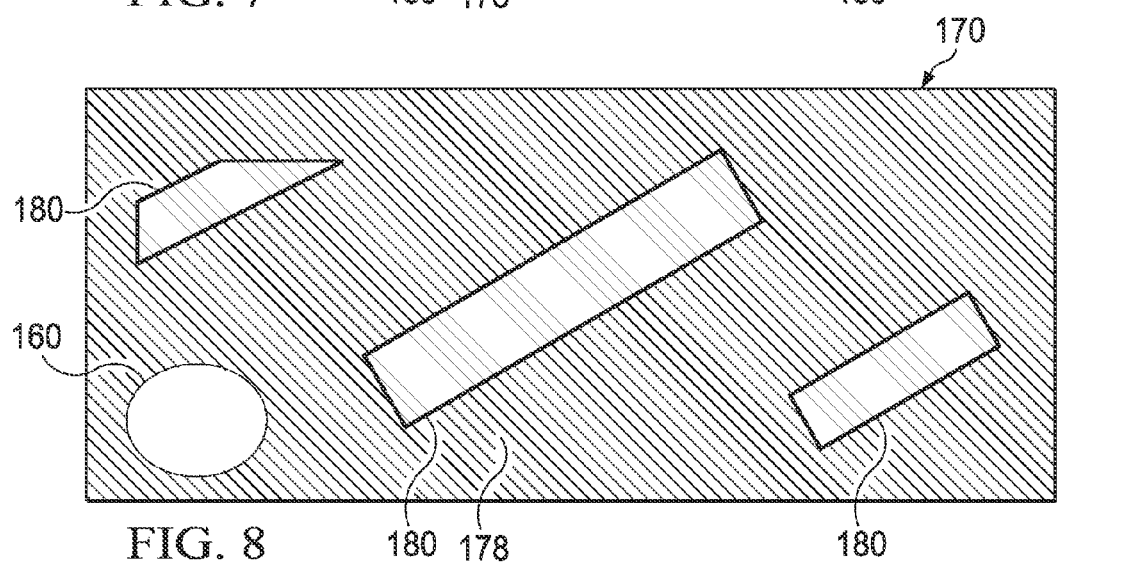
FIG. 8 is a schematic, pictorial representation of a filtered transformed image according to an illustrative embodiment.
Figure 9:
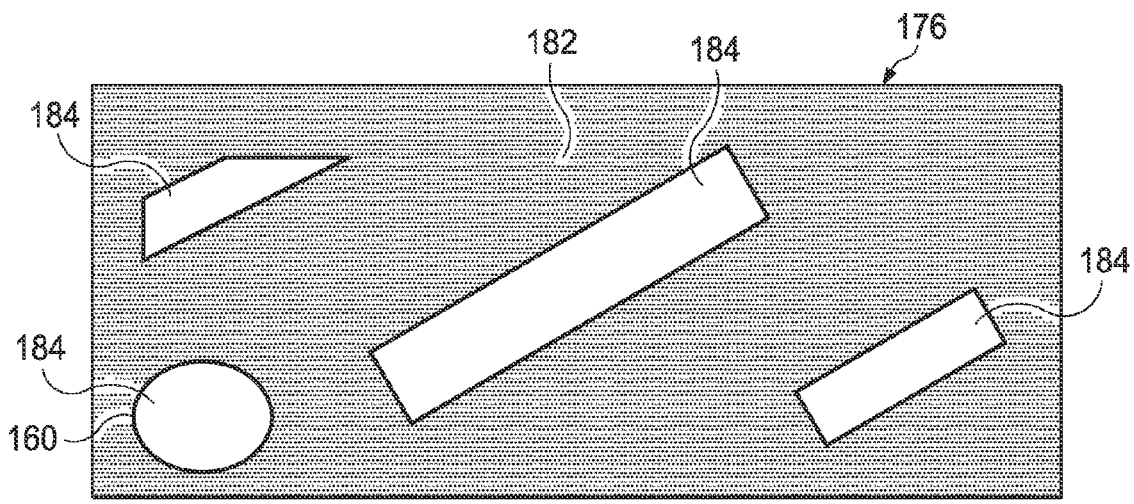
FIG. 9 is a schematic, pictorial representation of a binary image according to an illustrative embodiment.

In one embodiment, the tape detection application 114 includes a tape detection engine 162 that may detect tape 115 on the document 116 using the illumination images, such as the illumination images 154, 156, 158. The tape detection engine 162 may include an image transformer 164 that compares, or transforms, the white light illumination image 154, the specular reflected white light illumination image 156, and the ultraviolet light illumination image 158 to form, or generate, a transformed image 166 of the document 116; in one embodiment, the comparison, or transformation, may include a computational operation using the illumination images 154, 156, 158 that results in the formation of the transformed image 166. It will be appreciated that any two or more images of the document 116, each illuminated by one or more light sources, may be compared, or transformed, by the image transformer 164, and the image transformer 164 is not limited to comparing or transforming images formed from a plurality of line images. An example of the transformed image 166 is shown in FIG. 7. Each portion (e.g., pixel) of the transformed image 166 may have a respective intensity value that may be used toward detecting tape 115 on the document 116.

The transformed image 166 may be formed from the comparison of the illumination images 154, 156, 158 by the image transformer 164 in a variety of ways, which may depend on the number of illumination images 154, 156, 158 that are compared. In one embodiment, the transformed image 166 may be generated by the image transformer 164 by taking an absolute difference or subtraction with saturation between either or both of the white light illumination images 154, 156 and the ultraviolet light illumination image 158. The intensity values of portions (e.g., pixels) of the illumination images 154, 156, 158 may be used to form the transformation image 166. For example, the white light illumination image 154 may be subtracted from the specular reflected white light illumination image 156 to form a difference, and the ultraviolet light illumination image 158 may be added to this difference; expressed another way, the specular reflected white light illumination image 156 minus the white light illumination image 154 plus the ultraviolet light illumination image 158 may equal the transformed image 166. In another embodiment in which the tape detection system 100 includes only a single white light source and the ultraviolet light source 108, the white light illumination image may be subtracted from the ultraviolet light illumination image 158 to form the transformed image 166.

The transformed image 166 may bring the image of the tape 115 into sharper relief. In this non-limiting example, the transformed image 166, after having been transformed by the image transformer 164, shows both the shiny piece 177 and the matte pieces 119 of the tape 115. The transformed image 166 also shows the feature 160 that is embedded in the document 116.

In one embodiment, once the transformed image 166 has been generated, the image transformer 164 may perform image rotation on the transformed image 166, and the edges of the rotated image may be cleaned up or cropped.

In one embodiment, the tape detection engine 162 also includes a filtering module 168 that may filter the transformed image 166 to form a filtered transformed image 170. The filtering module 168 may be used to filter out small or barely distinguishable features from the document 116, such as the banknote markings 172 shown in the transformed image 166 or other small banknote features. To filter the transformed image 166, the filtering module 168 may use an edge-preserving smoothing filter, any other smoothing filter, or any other suitable filter. In one embodiment, the filtering module 168 uses a median filter to form the filtered transformed image 170. In one example of using the median filter, the median filter may have any radius or other area-determining parameter, such as R=3, 5, 15, etc. The area-determining parameter of the median filter may depend on the extent to which the transformed image 166 is desired to be filtered, including the size of the features desired to be filtered out.

The tape detection engine 162 may also include a binary conversion module 174 that converts the filtered transformed image 170 into a binary image 176. In another embodiment, the binary conversion module 174 may convert the transformed image 166 in the binary image 176. Each portion (e.g., pixel) of the binary image 176 has either a first or a second value. In one embodiment, each portion (e.g. pixel) of the binary image 176 has either a black or white color value, causing the binary image 176 to be a black-and-white image.

The binary conversion module 174 may use any suitable thresholding process to form the binary image 176, such as any histogram-based method to threshold a grayscale image. In one non-limiting embodiment, the binary conversion module 174 converts the filtered transformed image 170 by determining a most frequent intensity value of the filtered transformed image 170. Out of the intensity values of all the portions (e.g., pixels) of the filtered transformed image 170, the most frequent intensity value may be the intensity value that occurs most frequently in the filtered transformed image 170. To more accurately distinguish between portions of the filtered transformed image 170 that have and do not have tape 115, the binary conversion module 174 may offset the most frequent intensity value to form an offset most frequent intensity value. Offsetting the most frequent intensity value may help to ensure that some portions of the non-tape area 178 of the filtered transformed image 170 are not mistakenly converted into a white color in the binary image 176. Furthermore, filtering the transformed image 166, as described above in conjunction with the filtering module 168, may help to increase the range, or margin of error, by which the most frequent intensity value may be offset while still accurately converting the filtered transformed image 170 into the binary image 176.

Once the offset most frequent intensity value has been determined by the binary conversion module 174, the binary conversion module 174 may associate one or more portions of the filtered transformed image 170 having respective intensity values less than the offset most frequent intensity value to a first value or color, such as black or any other suitable color. With some possible exceptions (e.g., feature(s) 160 as previously discussed), this first value or color may generally correspond to the non-tape area 178 of the filtered transformed image 170. Furthermore, the binary conversion module 174 may associate one or more portions of the filtered transformed image 170 having respective intensity values that are greater than the offset most frequent intensity value to a second value or color, such as white or any other suitable color. Again, with some possible exceptions, this second value or color portion may generally correspond to a tape area 180 of the filtered transformed image 170. By associating portions of the filtered transformed image 170 in this fashion, a binary image 176 having a first area 182 and a second area 184 may result. In another embodiment, a median, average, mean, or other intensity value of the filtered transformed image 170 may be determined and offset instead of a most frequent intensity value.

Once the binary image 176 is formed, a tape area detection module 186 may determine whether tape 115 is adhered to the document 116 using the binary image 176. In one embodiment, the tape area detection module 186 determines whether the white area 184 of the binary image 176 exceeds a predetermined tape area threshold. For example, if the predetermined tape area threshold is 1 $cm^2$, the tape area detection module 186 may determine that tape 115 is adhered to the document 116 if the white area 184 exceeds 1 $cm^2$. In another example, the tape area detection module 186 may determine that the document 116 includes tape 115 if the number of white pixels making up the white area 184 exceeds a predetermined number of pixels. For example, if the predetermined number of pixels is 1000, the tape area detection module 186 may determine that tape 115 is adhered to the document 116 if the white area 184 includes 1000 or more pixels. In another embodiment, the tape area detection module 186 may determine whether tape 115 is adhered to the document 116 using the transformed image 166 or the filtered transformed image 170 without conversion to the binary image 176.

The tape area detection module 186 may also take into account certain reflective features, such as the feature 160 on the document 116. Because the feature 160 is shown on the binary image 176 as part of the white area 184, the area of the feature 160 may be improperly considered as an area on which tape 115 is located on the document 116. In order to correct for the feature 160, the predetermined tape area threshold may include the area of the feature 160; for example, the tape area detection module 186 may determine that tape 115 is adhered to the document 116 when the white area 184 exceeds an area of the feature 160 plus some desired value (e.g., 2 $cm^2$, 1000 pixels, etc.). When pixels, instead of area, are counted, the pixel threshold for detecting tape 115 may include the number of pixels representing the feature 160 in the binary image 176. Because different types of documents include different types of reflective features, the feature area, or number of pixels representing the feature, may be predetermined, empirically, or automatically determined for each different type of document 116.

If the tape area detection module 186 determines that tape 115 is present on the document 116, the tape detection application 114 may output a determination that the document 116 includes tape 115, and may also output the area of the tape 115 that is present on the document 116.

Figure 10:
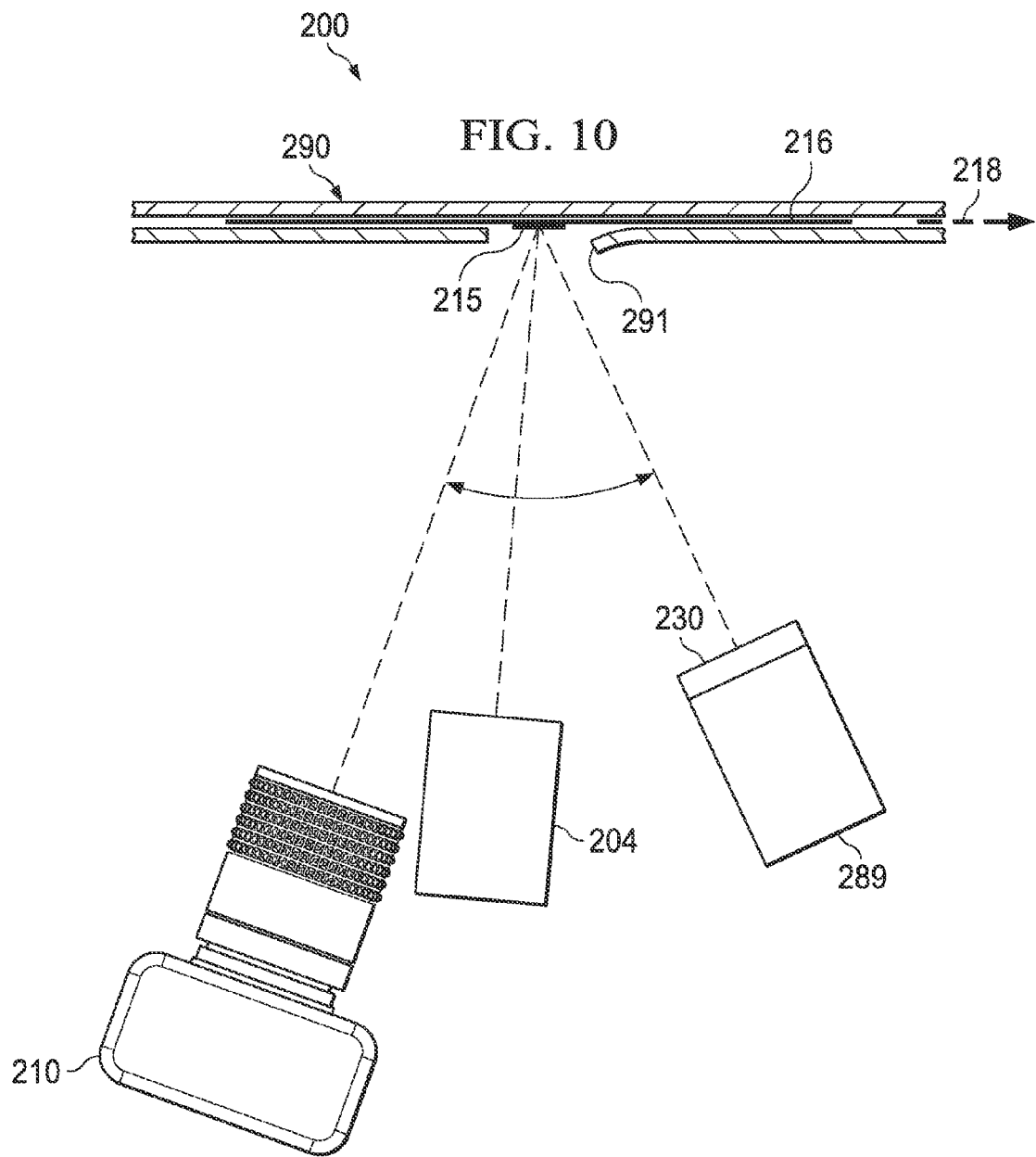
FIG. 10 is a schematic, pictorial representation of a tape detection system according to another illustrative embodiment.

Referring to FIG. 10, another illustrative embodiment of the tape detection system 200 includes two light sources 204, 289. Elements of FIG. 10 that are analogous to elements in FIGS. 1-9 have been shown by indexing the reference numerals by 100. In contrast to the illustrative embodiment shown in FIG. 1, the light source 289 is a hybrid light source that is capable of emitting either ultraviolet or white light. While some of the illustrative embodiments employ ultraviolet and white light, it will be appreciated that any source capable of emitting any suitable form of electromagnetic radiation may be employed. In the example of FIG. 10, the white light emitted from the hybrid light source 289 is specularly reflected from the document 216. The hybrid light source 289 may house LEDs for both ultraviolet light and white light. The diffuser 230 may also be positioned in the line of sight of the hybrid light source 289.

The tape detection system 200 also includes a document guide 290 that moves the document 216 along the path 218. The document guide 290 forms an exposure slit 291 that exposes a portion of the document 216 as the document 216 moves along the path 218. The portion of the document 216 that is exposed changes as the document 216 moves along the path 218, thereby allowing different portions of the document 216 to be illuminated and captured by the tape detection system 200.

In an alternative embodiment, the white light source 204 may be removed, or inactivated, from the tape detection system 200 such that the only light source in the tape detection system 200 is the hybrid light source 289. In this alternative embodiment, the hybrid light source 289 alternates between emitting ultraviolet and white light so that the line scan camera 210 can capture line images to create a white light illumination image and an ultraviolet light illumination image.

Figure 11:
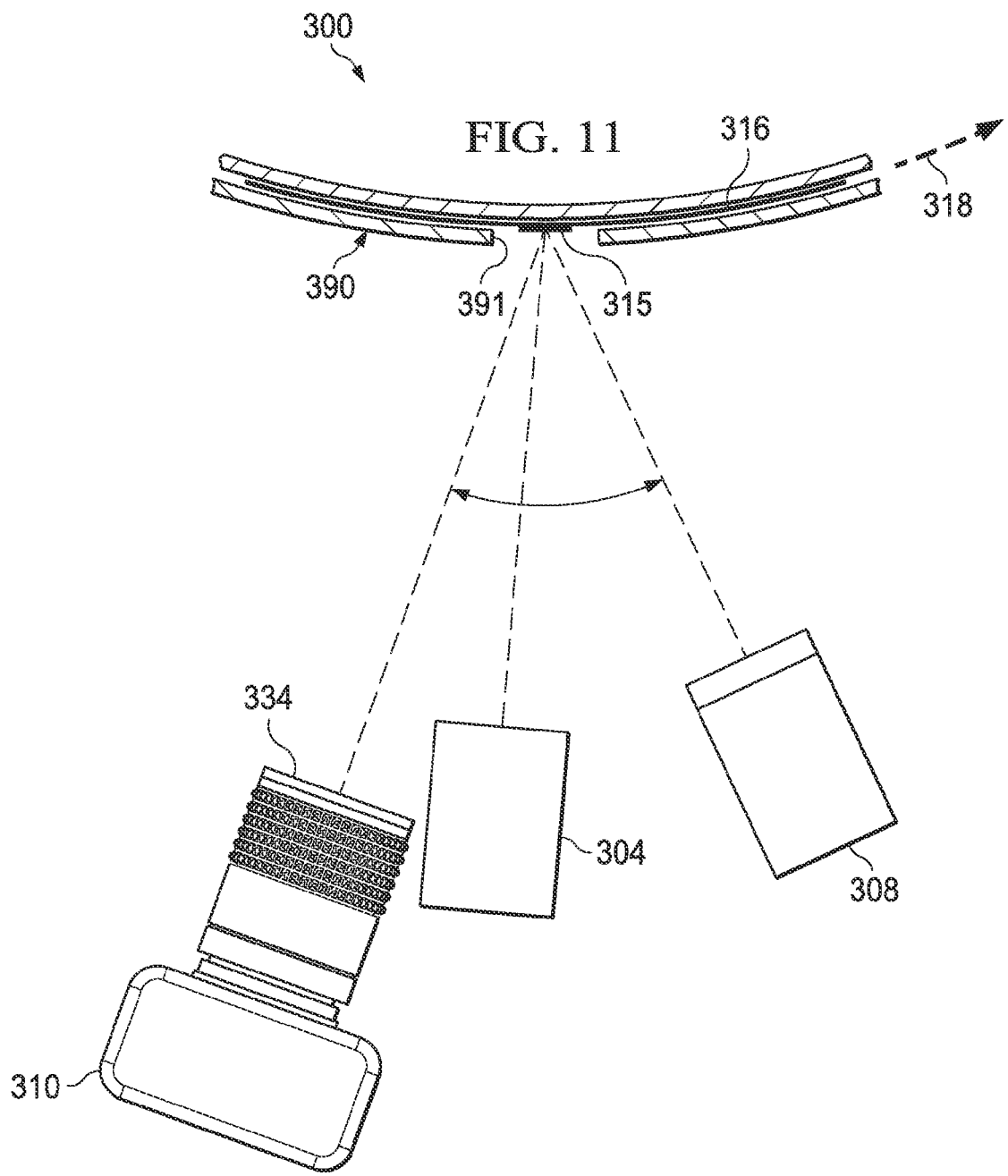
FIG. 11 is a schematic, pictorial representation of a tape detection system having two light sources according to another illustrative embodiment.

Referring to FIG. 11, another illustrative embodiment of the tape detection system 300 includes two light sources: the white light source 304 and the ultraviolet light source 308. Elements of FIG. 11 that are analogous to elements in FIGS. 1-10 have been shown by indexing the reference numerals by 100 or 200. Illumination of the document 316 at the exposure slit 391 may alternate between the ultraviolet light source 308 and the white light source 304 so that two sets of line images, each set illuminated by one of the light sources 304, 308, is captured by the line scan camera 310. Like the other embodiments described herein, the white light source 304 and the ultraviolet light source 308 may illuminate the document 316 at any angle. Also, the document guide 390, in this embodiment, is curved so as to move the document 316 along a curved path 318. By way of non-limiting example, when two light sources are used, as shown in FIG. 11, the blocking filter 334 may be a 390 or 400 nanometer ultraviolet light blocking filter; however, any type of blocking filter may be used, including none at all.

Figure 12:
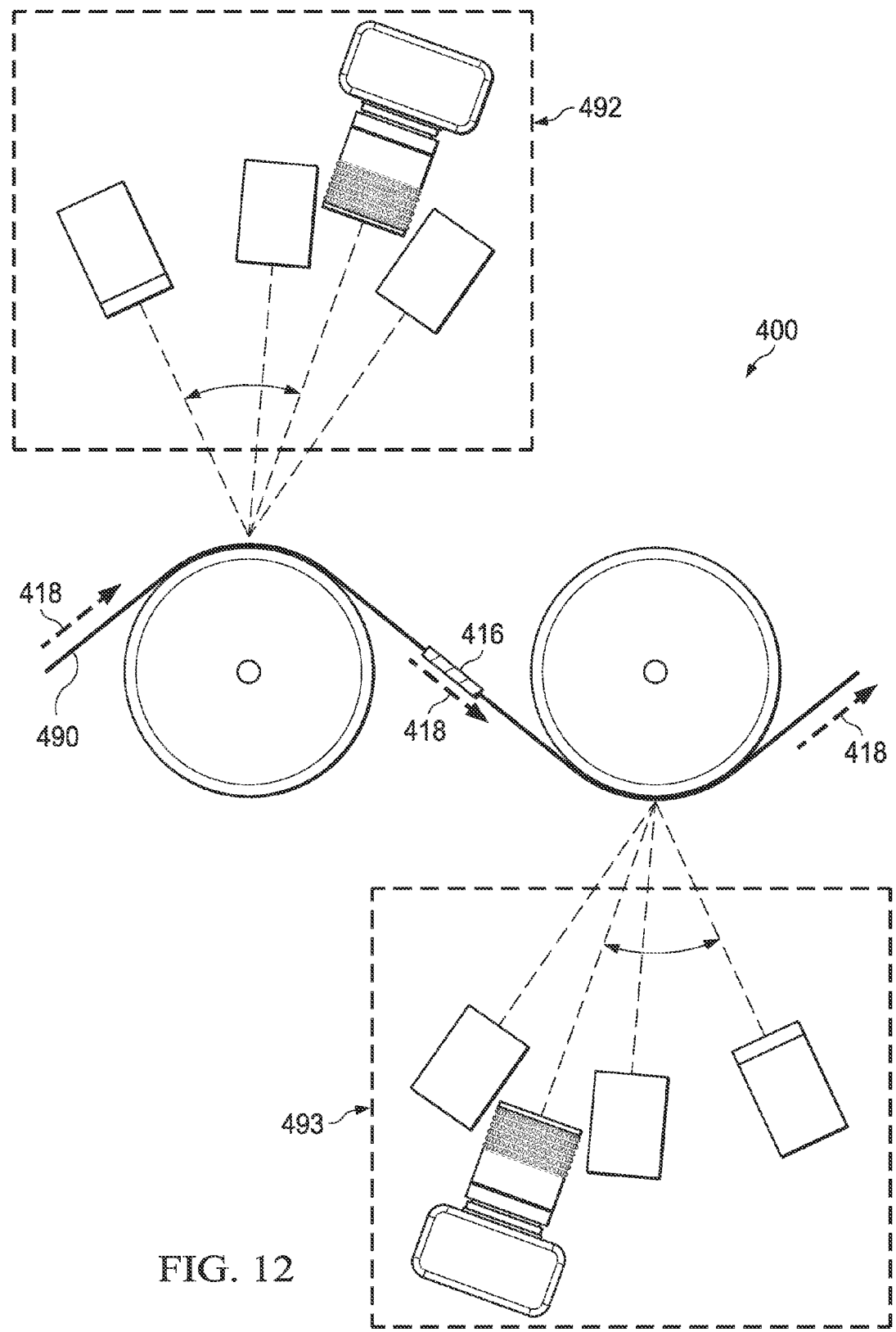
FIG. 12 is a schematic, pictorial representation of a tape detection system for detecting tape on either or both sides of a document according to another illustrative embodiment.

Referring to FIG. 12, an illustrative embodiment of the tape detection system 400 includes two tape detection subsystems 492, 493. Elements of FIG. 12 that are analogous to elements in FIGS. 1-11 have been shown by indexing the reference numerals by 100, 200, or 300. The tape detection subsystems 492, 493 may be any of the illustrative embodiments of tape detection systems described above. The inclusion of tape detection subsystems 492, 493 on both sides of the document path 418 allow tape detection, as described above, to occur on both sides of the document 416. As shown in FIG. 12, the document 416 may be aided along the document path 418 using the document guide 490.

In one example, the illustrative embodiments may be used to generate a set of substantially or perfectly aligned illumination images, allowing subtraction of a reference frame, such as the white light illumination image 154, to isolate or amplify foreign features, such as the tape 115.

In an alternate embodiment, the white light sources, such as white light sources 104 and 106, used in the any of the illustrative embodiments, including the three-light configuration of FIG. 1, may be replaced with light sources that emit infrared or near-infrared light. In this embodiment, a specular reflected infrared light illumination image minus a direct, or semi-direct, infrared light illumination image plus the ultraviolet light illumination image 158 may equal the transformed image 166. To suppress the background of the ultraviolet light illuminated image, a stronger ultraviolet light blocking filter may be used, such as a 430 nanometer ultraviolet light blocking filter. In one example, use of infrared wavelengths may help to detect shiny tape.

Figure 13A:
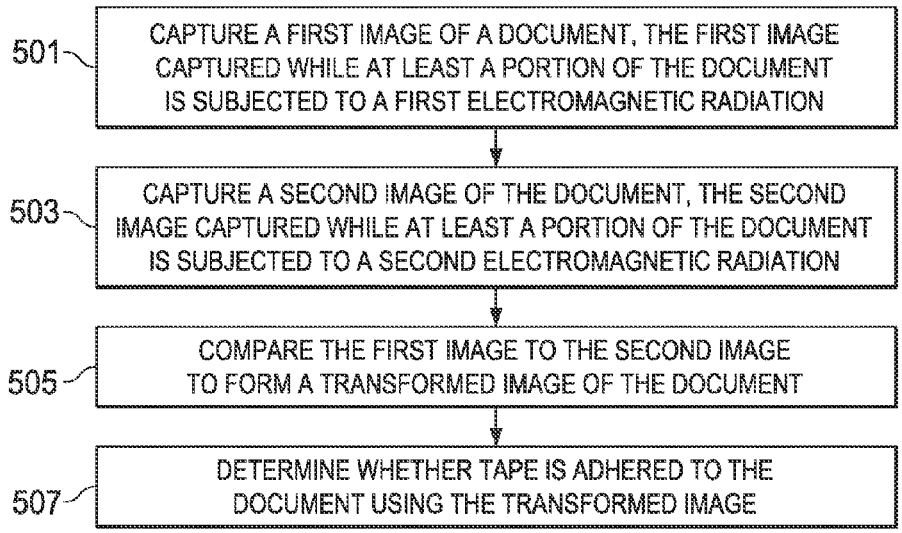
FIG. 13A is a flowchart of a process for detecting tape on a document according to an illustrative embodiment.

Referring to FIG. 13A, an illustrative embodiment of a process for detecting tape on a document that may be executed by a tape detection system includes capturing a first image of a document (step 501). The first image may be captured while at least a portion of the document is subjected to a first electromagnetic radiation. The process captures a second image of the document (step 503). The second image may be captured while at least a portion of the document is subjected to a second electromagnetic radiation. The process compares the first image to the second image to form a transformed image of the document (step 505). The process determines whether tape is adhered to the document using the transformed image (step 507). In another embodiment, in lieu of steps 505 and 507, the process may compare the first image to the second image to determine whether tape is adhered to the document.

Figure 13B:
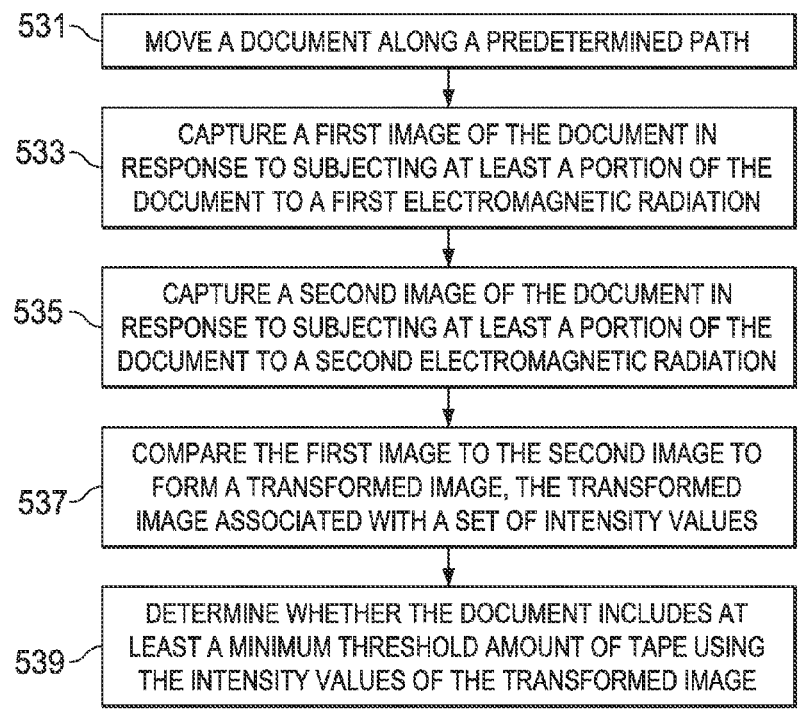
FIG. 13B is a flowchart of a process for detecting tape on a document according to another illustrative embodiment.

Referring to FIG. 13B, an illustrative embodiment of a process for detecting tape on a document that may be executed by a tape detection system includes moving a document along a predetermined path (step 531). The process captures a first image of the document in response to subjecting at least a portion of the document to a first electromagnetic radiation (step 533). The process captures a second image of the document in response to subjecting at least a portion of the document to a second electromagnetic radiation (step 535). The process compares the first image to the second image to form a transformed image (step 537). The transformed image may be associated with a set of intensity values. The process determines whether the document includes at least a minimum threshold amount of tape using the intensity values of the transformed image (step 539).

Figure 13C:
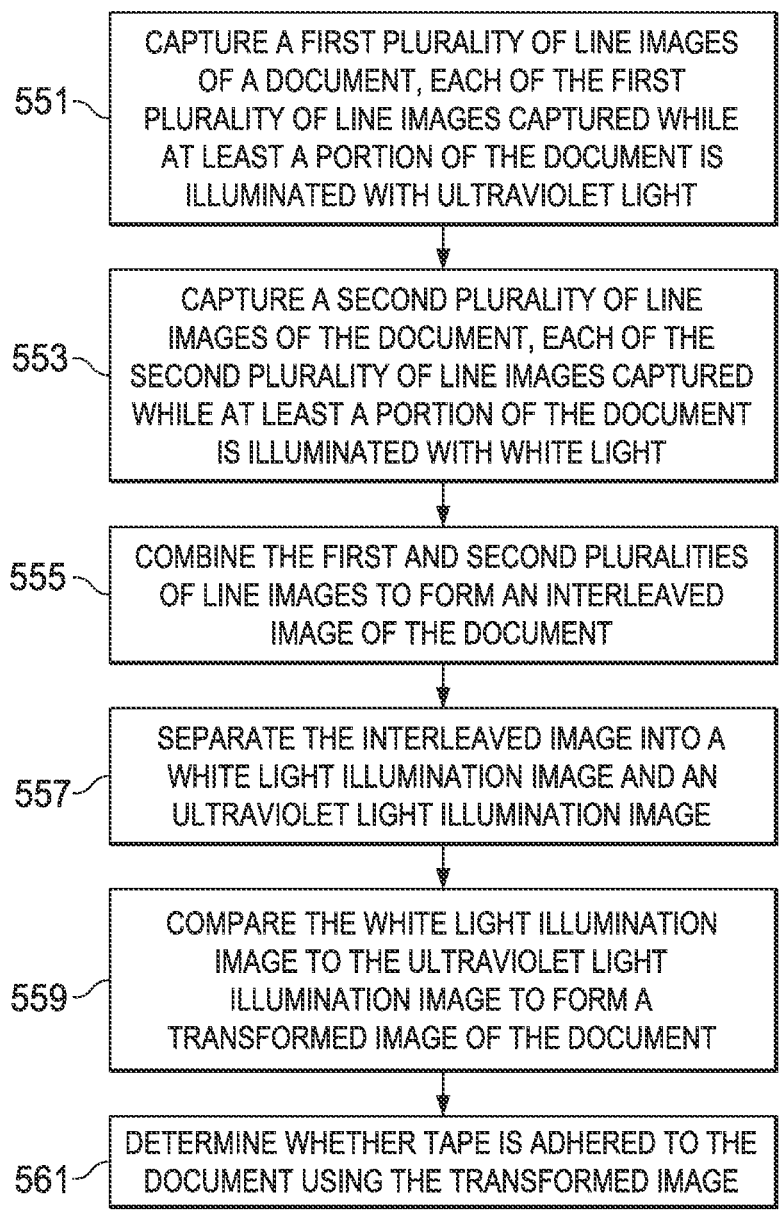
FIG. 13C is a flowchart of a process for detecting tape on a document according to another illustrative embodiment.

Referring to FIG. 13C, an illustrative embodiment of a process for detecting tape on a document that may be executed by a tape detection system includes capturing a first plurality of line images of a document (step 551). Each of the first plurality of line images may be captured while at least a portion of the document is illuminated with ultraviolet light. The process captures a second plurality of line images of the document (step 553). Each of the second plurality of line images may be captured while at least a portion of the document is illuminated with white light. The process combines the first and second plurality of line images to form an interleaved image of the document (step 555).

The process separates the interleaved image into a white light illumination image and an ultraviolet light illumination image (step 557). The process compares the white light illumination image to the ultraviolet light illumination image to form a transformed image of the document (step 559). The process determines whether tape is adhered to the document using the transformed image (step 561). In the illustrative embodiments, using the transformed image to determine whether tape is adhered to the document may include converting the transformed image into another type of image, such as a filtered transformed image or a binary image.

Figure 14:
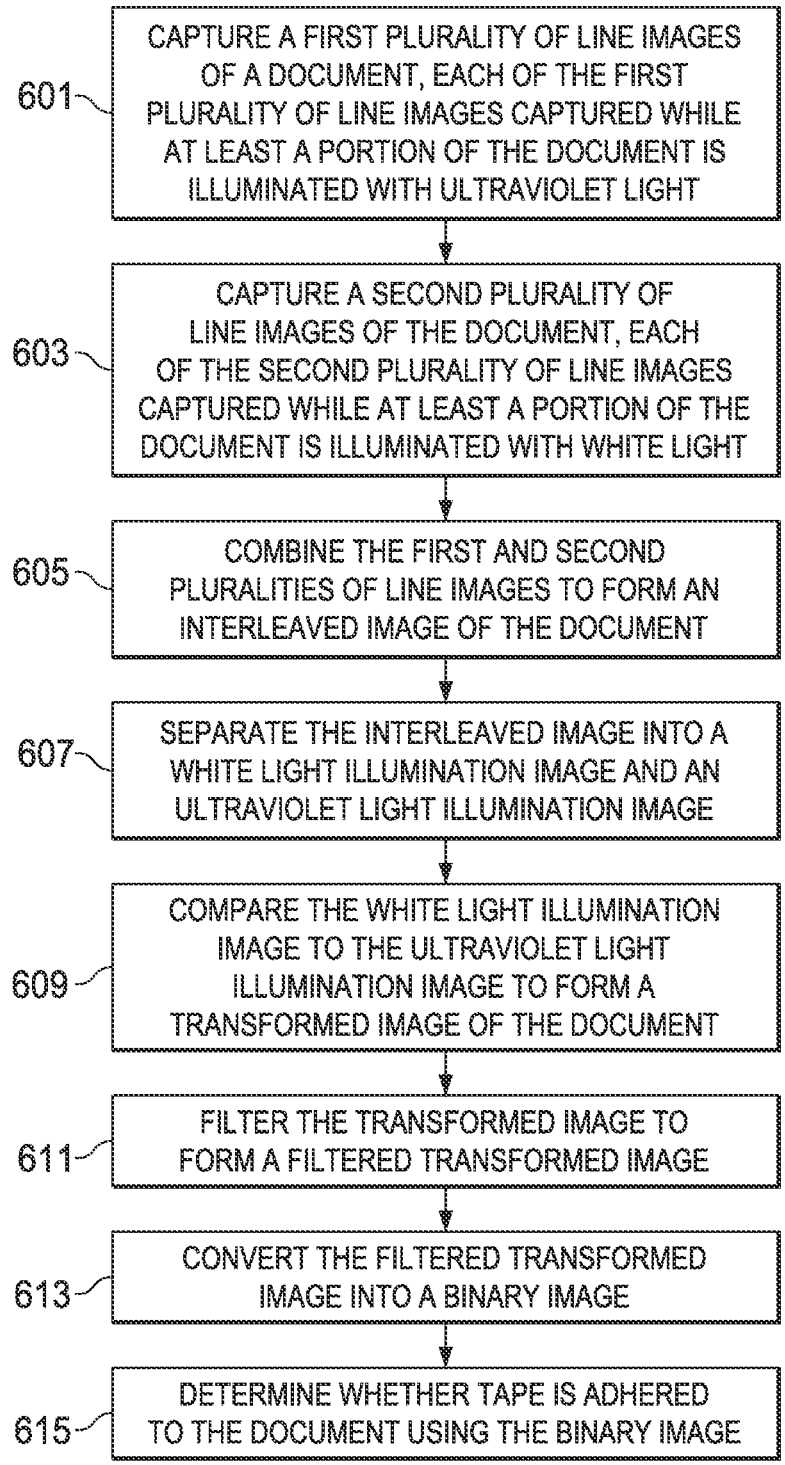
FIG. 14 is a flowchart of a process for detecting tape on a document according to another illustrative embodiment.

Referring to FIG. 14, an illustrative embodiment of a process for detecting tape on a document that may be executed by a tape detection system includes capturing a first plurality of line images of the document (step 601). Each of the first plurality of line images may be captured while at least a portion of the document is illuminated with ultraviolet light. The process captures a second plurality of line images of the document (step 603). Each of the second plurality of line images may be captured while at least a portion of the document is illuminated with white light. The process combines, or aggregates, the first and second plurality of line images to form an interleaved image of the document (step 605).

The process separates the interleaved image into a white light illumination image and an ultraviolet light illumination image (step 607). The process compares the white light illumination image to the ultraviolet light illumination image to form a transformed image of the document (step 609). The process filters the transformed image to form a filtered transformed image (step 611). The process converts the filtered transformed image into a binary image (step 613). The process determines whether tape is adhered the document using the binary image (step 615).

Figure 15:
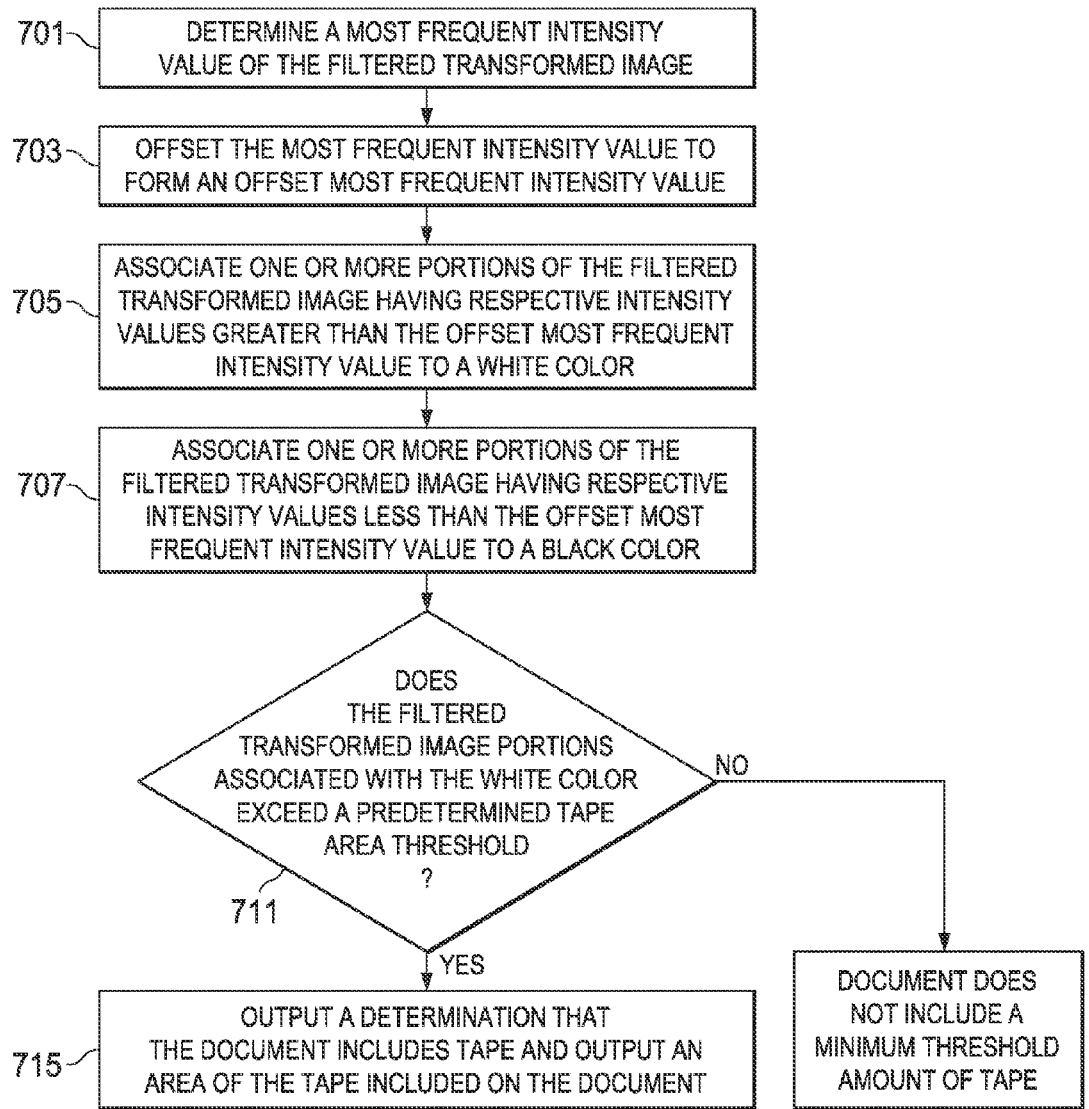
FIG. 15 is a flowchart of a process for forming a binary image and detecting tape on a document according to an illustrative embodiment.

Referring to FIG. 15, an illustrative embodiment of a process for forming a binary image and detecting tape on a document, as mentioned in steps 613 and 615 of FIG. 14, includes determining a most frequent intensity value of the filtered transformed image (step 701). The process offsets the most frequent intensity value to form an offset most frequent intensity value (step 703). The process associates one or more portions of the filtered transformed image having respective intensity values greater than the offset most frequent intensity value to a white color (step 705). The process associates one or more portions of the filtered transformed image having respective intensity values less than the offset most frequent intensity value to a black color (step 707).

The process determines whether the filtered transformed image portions associated with the white color exceed a predetermined tape area threshold (step 711). If the process determines that the filtered transformed image portions associated with the white color does not exceed the predetermined tape area threshold, the document does not include a minimum threshold amount of tape (step 713). If the process determines that the filtered transformed image portions associated with the white color exceed a predetermined tape area threshold, the process outputs a determination that the document includes tape and outputs an area of the tape included on the document (step 715).

Figure 16:
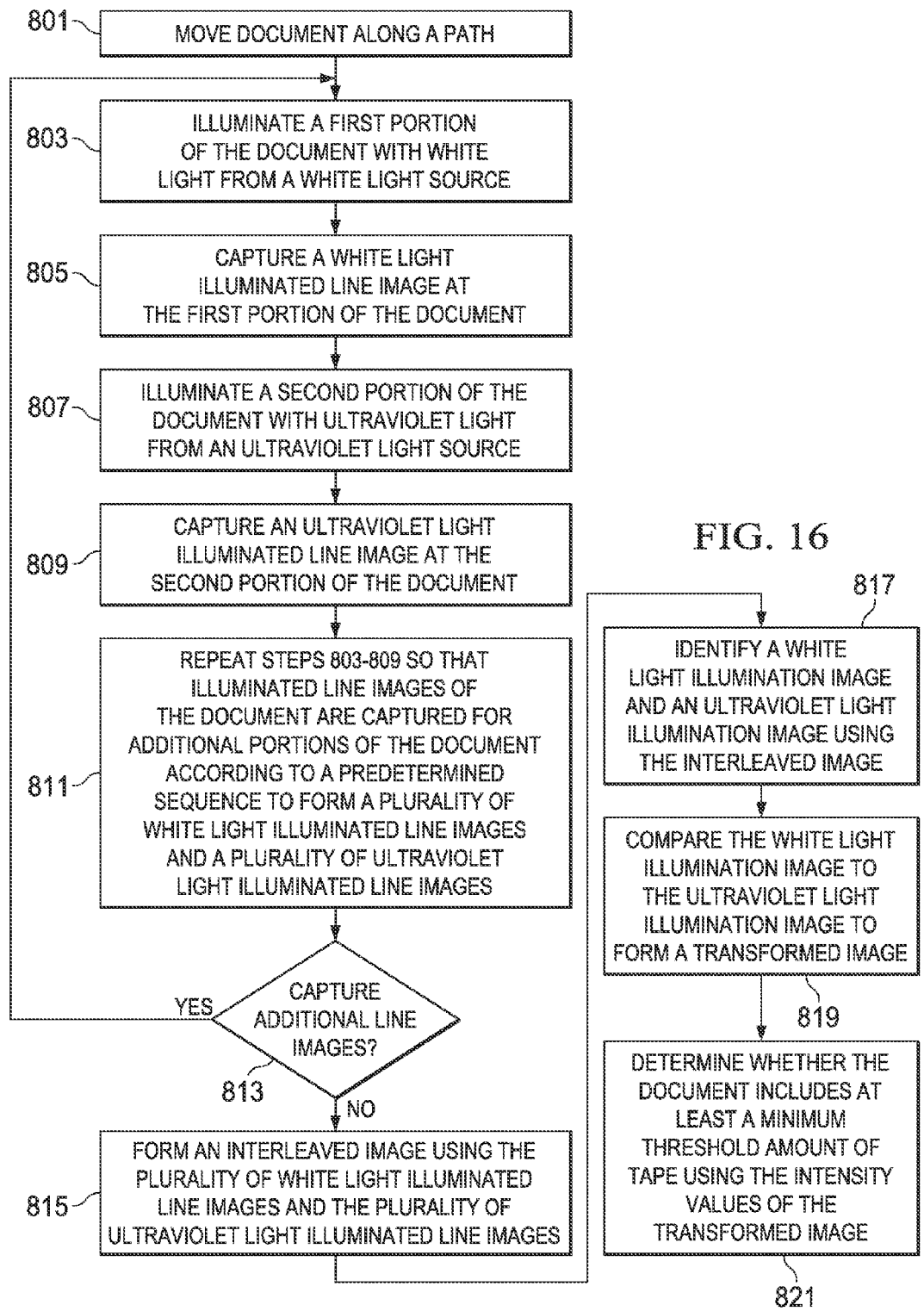
FIG. 16 is a flowchart of a process for detecting tape on a document according to another illustrative embodiment.

Referring to FIG. 16, an illustrative embodiment of a process for detecting tape on a document that may be executed by a tape detection system includes moving a document along a path (step 801). The process illuminates a first portion of the document with white light from a white light source (step 803). The process captures a white light illuminated line image at the first portion of the document (step 805). The process illuminates a second portion of the document with ultraviolet light from an ultraviolet light source (step 807). The process captures an ultraviolet light illuminated line image at a second portion of the document (step 809).

The process repeats steps 803-809 so that illuminated line images of the document are captured for additional portions of the document according to a predetermined sequence to form a plurality of white light illuminated line images and a plurality of ultraviolet light illuminated line images (step 811). The process determines whether to capture additional line images (step 813). If the process determines to capture additional line images, the process may return to step 803.

If the process determines not to capture additional line images, the process forms an interleaved image using the plurality of white light illuminated line images and the plurality of ultraviolet light illuminated line images (step 815). The process identifies a white light illumination image and an ultraviolet light illumination image using the interleaved image (step 817). The process compares the white light illumination image to the ultraviolet light illumination image to form a transformed image (step 819). The process determines whether the document includes at least a minimum threshold amount of tape using the intensity values of the transformed image (step 821).

Figure 17:
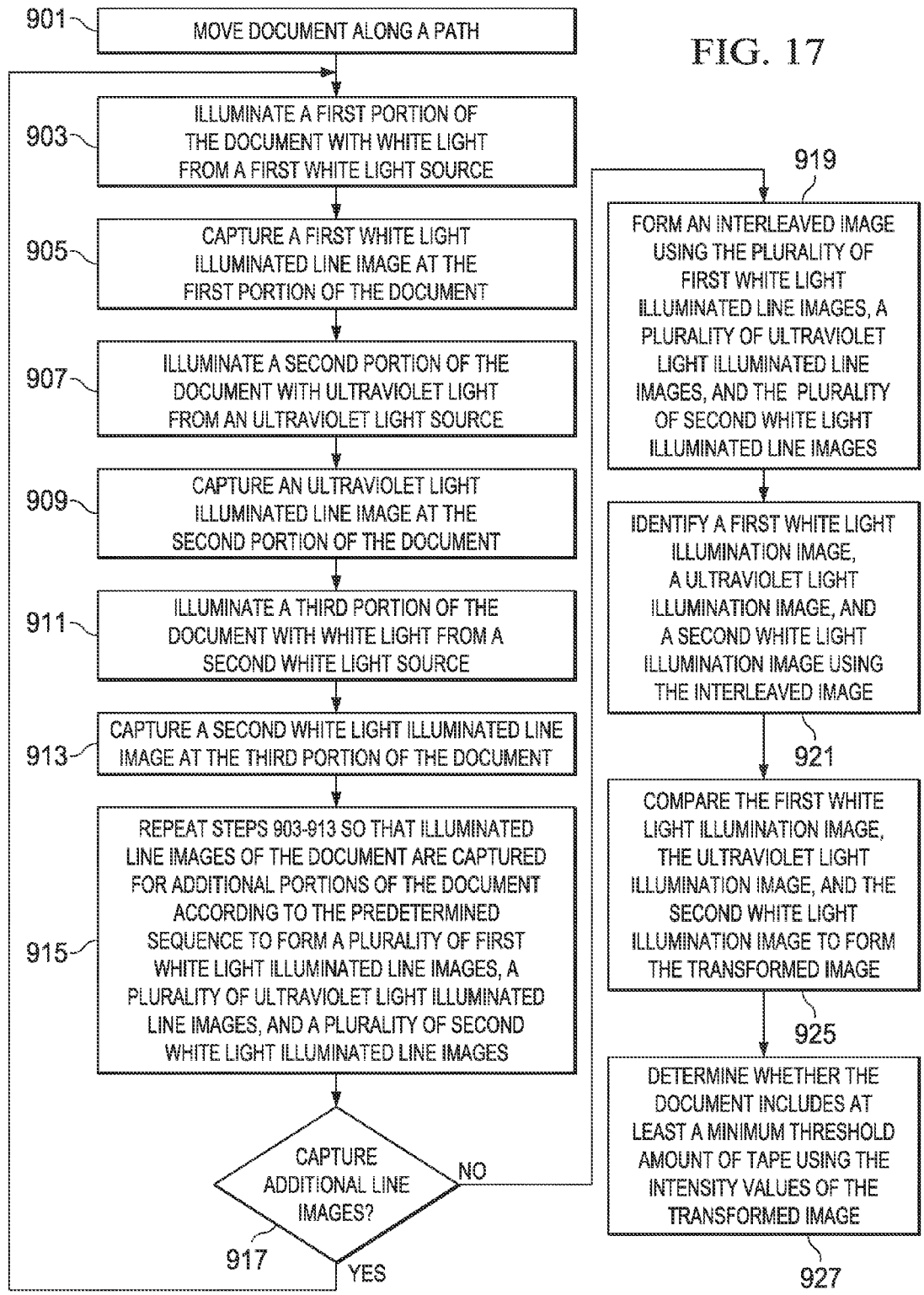
FIG. 17 is a flowchart of a process for detecting tape on a document using three light sources according to an illustrative embodiment.

Referring to FIG. 17, an illustrative embodiment of a process for detecting tape on a document that may be executed by a tape detection system includes moving a document along a path (step 901). The process illuminates a first portion of the document with white light from a first white light source (step 903). The process captures a first white light illuminated line image at the first portion of the document (step 905). The process illuminates a second portion of the document with ultraviolet light from an ultraviolet light source (step 907. The process captures an ultraviolet light illuminated line image at the second portion of the document (step 909).

The process illuminates a third portion of the document with white light from a second white light source (step 911). In one embodiment, the second white light source illuminates the document from a different angle than the first white light source. The process captures a second white light illuminated line image at a third portion of the document (step 913). The process repeats steps 903-913 so that illuminated line images of the document are captured for additional portions of the document according to the predetermined sequence to form a plurality of first white light illuminated line images, a plurality of ultraviolet light illuminated line images, and a plurality of second white light illuminated line images (step 915). The process determines whether to capture additional line images (step 917). If the process determines to capture additional line images, the process may return to step 903.

If the process determines not to capture additional line images, the process forms an interleaved image using the plurality of first white light illuminated line images, the plurality of ultraviolet light illuminated line images, and the plurality of second white light illuminated line images (step 919). The process identifies a first white light illumination image, an ultraviolet light illumination image, and a second white light illumination image using the interleaved image (step 921). The process compares the first white light illumination image, the ultraviolet light illumination image, and the second white light illumination image to form the transformed image (step 925). The process determines whether the document includes at least a minimum threshold amount of tape using the intensity values of the transformed image (step 927).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

Figure 18:
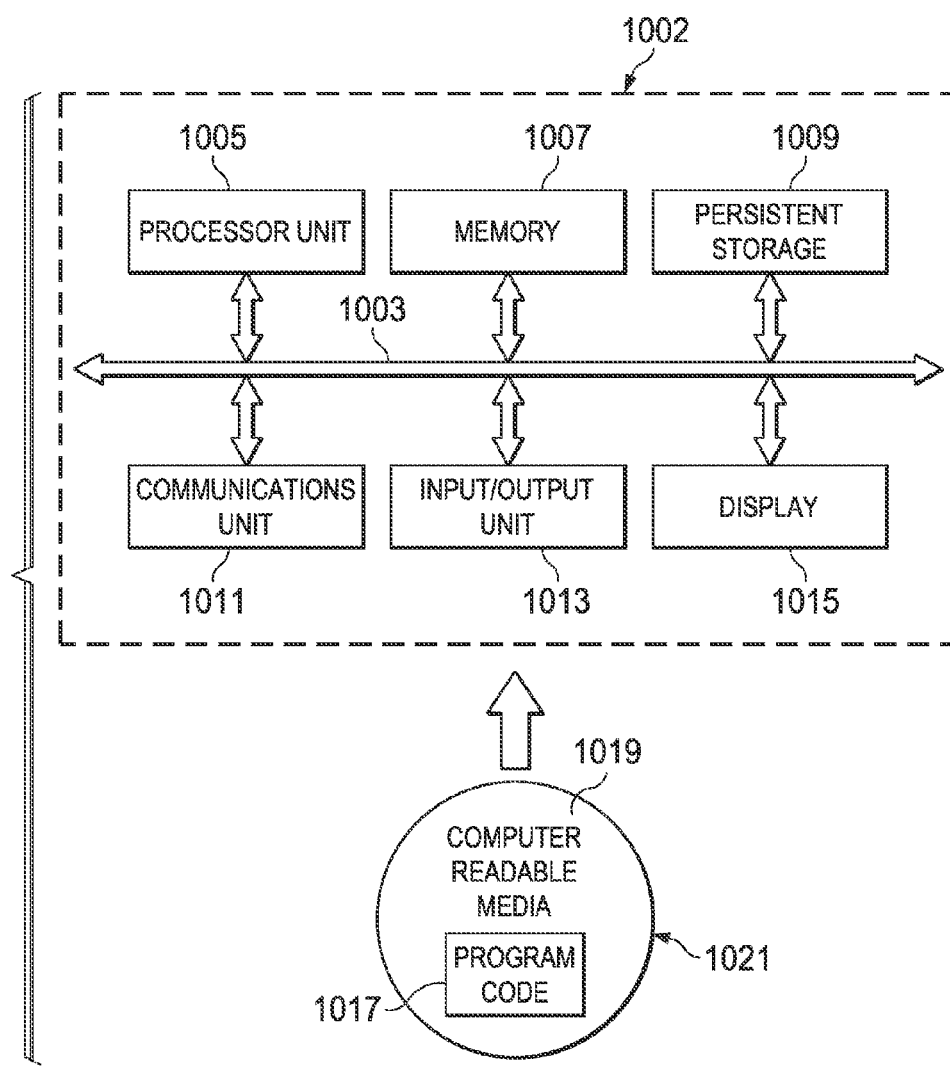
FIG. 18 is a schematic, block diagram of a data processing system in which the illustrative embodiments, including the controller, may be implemented.

Referring to FIG. 18, a block diagram of a computing device 1002 is shown in which the illustrative embodiments may be implemented. In one embodiment, the controller 112 in FIG. 1 may be implemented using the computing device 1002, and the tape detection application 114 may be implemented on the computing device 1002. Computer-usable program code or instruct ions implementing the processes used in the illustrative embodiments may be located on the computing device 1002. The computing device 1002 includes a communications fabric 1003, which provides communications between a processor unit 1005, a memory 1007, a persistent storage 1009, a communications unit 1011, an input/output (I/O) unit 1013, and a display 1015.

The processor unit 1005 serves to execute instructions for software that may be loaded into the memory 1007. The processor unit 1005 may be a set of one or more processors or may be a multi-processor core, depending on the particular implementation. Further, the processor unit 1005 may be implemented using one or more heterogeneous processor systems in which a main processor is present with secondary processors on a single chip. As another illustrative example, the processor unit 1005 may be a symmetric multi-processor system containing multiple processors of the same type.

The memory 1007, in these examples, may be, for example, a random access memory or any other suitable volatile or non-volatile storage device. The persistent storage 1009 may take various forms depending on the particular implementation. For example, the persistent storage 1009 may contain one or more components or devices. For example, the persistent storage 1009 may be a hard drive, a flash memory, a rewritable optical disk, a rewritable magnetic tape, or some combination of the above. The media used by the persistent storage 1009 also may be removable. For example, a removable hard drive may be used for the persistent storage 1009.

The communications unit 1011, in these examples, provides for communications with other data processing systems or communication devices. In these examples, the communications unit 1011 may be a network interface card. The communications unit 1011 may provide communications through the use of either or both physical and wireless communication links.

The input/output unit 1013 allows for the input and output of data with other devices that may be connected to the computing device 1002. For example, the input/output unit 1013 may provide a connection for user input through a keyboard and mouse. Further, the input/output unit 1013 may send output to a processing device. The display 1015 provides a mechanism to display information to a user, such as a graphical user interface.

Instructions for the operating system and applications or programs are located on the persistent storage 1009. These instructions may be loaded into the memory 1007 for execution by the processor unit 1005. The processes of the different embodiments may be performed by the processor unit 1005 using computer-implemented instructions, which may be located in a memory, such as the memory 1007. These instructions are referred to as program code, computer-usable program code, or computer-readable program code that may be read and executed by a processor in the processor unit 1005. The program code in the different embodiments may be embodied on different physical or tangible computer-readable media, such as the memory 1007 or the persistent storage 1009.

Program code 1017 is located in a functional form on a computer-readable media 1019 and may be loaded onto or transferred to the computing device 1002 for execution by the processor unit 1005. The program code 1017 and the computer-readable media 1019 form computer program product 1021 in these examples. In one embodiment, the computer program product 1021 is the tape detection application 114 described in FIGS. 1-9. In this embodiment, the program code 1017 may include computer-usable program code capable of capturing a first image of a document. The first image is captured while at least a portion of the document is subjected to a first electromagnetic radiation. The program code 1017 may also include computer-usable program code capable of capturing a second image of the document. The second image is captured while at least a portion of the document is subjected to a second electromagnetic radiation. The program code 1017 may also include computer-usable program code capable of comparing the first image to the second image to determine whether tape is adhered to the document.

In another embodiment, the program code 1017 may include computer-usable program code capable of moving a document along a predetermined path, capturing a first image of the document in response to subjecting at least a portion of the document to a first electromagnetic radiation, capturing a second image of the document in response to subjecting at least a portion of the document to a second electromagnetic radiation, and comparing the first image to the second image to form a transformed image. The transformed image is associated with a set of intensity values. The program code 1017 may also include computer-usable program code capable of determining whether the document includes at least a minimum threshold amount of tape using the intensity values of the transformed image. Any combination of the above-mentioned computer-usable program code may be implemented in the program code 1017, and any functions of the illustrative embodiments may be implemented in the program code 1017.

In one example, the computer-readable media 1019 may be in a tangible form, such as, for example, an optical or magnetic disc that is inserted or placed into a drive or other device that is part of the persistent storage 1009 for transfer onto a storage device, such as a hard drive that is part of the persistent storage 1009. In a tangible form, the computer-readable media 1019 also may take the form of a persistent storage, such as a hard drive or a flash memory that is connected to the computing device 1002. The tangible form of the computer-readable media 1019 is also referred to as computer recordable storage media.

Alternatively, the program code 1017 may be transferred to the computing device 1002 from the computer-readable media 1019 through a communication link to the communications unit 1011 or through a connection to the input/output unit 1013. The communication link or the connection may be physical or wireless in the illustrative examples. The computer-readable media 1019 also may take the form of non-tangible media, such as communication links or wireless transmissions containing the program code 1017. In one embodiment, the program code 1017 is delivered to the computing device 1002 over the Internet.

The different components illustrated for the computing device 1002 are not meant to provide architectural limitations to the manner in which different embodiments may be implemented. The different illustrative embodiments may be implemented in a data processing system including components in addition to or in place of those illustrated for computing device 1002. Other components shown in FIG. 18 can be varied from the illustrative examples shown.

As one example, a storage device in the computing device 1002 is any hardware apparatus that may store data. The memory 1007, the persistent storage 1009, and the computer-readable media 1019 are examples of storage devices in a tangible form.

In another example, a bus system may be used to implement the communications fabric 1003 and may be comprised of one or more buses, such as a system bus or an input/output bus. Of course, the bus system may be implemented using any suitable type of architecture that provides for a transfer of data between different components or devices attached to the bus system. Additionally, the communications unit 1011 may include one or more devices used to transmit and receive data, such as a modem or a network adapter. Further, a memory may be, for example, the memory 1007 or a cache such as found in an interface and memory controller hub that may be present in the communications fabric 1003.

As used herein, including in the claims, the term "set" encompasses a quantity of one or more. As used herein, including in the claims, the terms first, second, third, etc. . . . used in relation to an element (e.g., first image, second image, etc.) are for reference or identification purposes only, and these terms are not intended to describe or suggest a number, order, source, purpose, or substantive quality for any element for which such a term is used.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. It will be appreciated that any feature that is described in a connection to any one embodiment may also be applicable to any other embodiment.

What is claimed is:

1. A method for detecting tape on a document, the method comprising:
capturing a first image of a document, the first image captured while at least a portion of the document is subjected to a first electromagnetic radiation;
capturing a second image of the document, the second image captured while at least a portion of the document is subjected to a second electromagnetic radiation; and
comparing the first image to the second image to determine whether tape is adhered to the document;
wherein capturing the first image of the document comprises capturing a first plurality of line images of the document to form the first image, and wherein capturing the second image of the document comprises capturing a second plurality of line images of the document to form the second image, and
wherein each line image is an image of a vertically spread line of sight of a segment of the document that is less than a whole of the document.

2. The method of claim 1, wherein each of the first electromagnetic radiation and the second electromagnetic radiation is one of ultraviolet light, white light, or specular reflected white light.

3. The method of claim 1, wherein capturing the first and second images further comprises combining the first and second pluralities of line images to form an interleaved image of the document, and separating the interleaved image into the first image and the second image.

4. The method of claim 1, further comprising:
capturing a third image of the document, the third image captured while the document is subjected to a third electromagnetic radiation; and
wherein comparing the first image to the second image to determine whether tape is adhered to the document comprises comparing the first image, the second image, and the third image to determine whether tape is adhered to the document.

5. The method of claim 4, wherein each of the first electromagnetic radiation, the second electromagnetic radiation, and the third electromagnetic radiation is one of ultraviolet light, white light, or specular reflected white light.

6. The method of claim 4, wherein capturing the first image of the document comprises capturing a first plurality of line images of the document to form the first image;
wherein capturing the second image of the document comprises capturing a second plurality of line images of the document to form the second image; and
wherein capturing the third image of the document comprises capturing a third plurality of line images of the document to form the third image.

7. The method of claim 1, wherein each of the first plurality of line images captured while at least a portion of the document is illuminated with ultraviolet light, and wherein each of the second plurality of line images captured while at least a portion of the document is illuminated with white light; and
wherein capturing the first and second images further comprises combining the first and second pluralities of line images to form an interleaved image of the document, and separating the interleaved image into the first image and the second image, the first image being an ultraviolet light illumination image and the second image being a white light illumination image.

8. The method of claim 7, further comprising:
capturing a third plurality of line images of the document, each of the third plurality of line images captured while the document is illuminated with specular reflected white light;
wherein combining the first and second pluralities of line images to form the interleaved image comprises combining the first, second, and third pluralities of line images to form the interleaved image;
wherein separating the interleaved image into the first image and the second image comprises separating the interleaved image into the first image, the second image, and a third image, the third image being a specular reflected white light image; and
wherein comparing the first image to the second image to determine whether tape is adhered to the document comprises comparing the first image, the second image, and the third image to determine whether tape is adhered to the document.

9. The method of claim 7, wherein the first and second pluralities of line images in the interleaved image are arranged in a predetermined sequence.

10. The method of claim 1, wherein comparing the first image to the second image to determine whether tape is adhered to the document comprises:
comparing the first image to the second image to form a transformed image of the document; and determining whether tape is adhered to the document using the transformed image.

11. The method of claim 10, wherein determining whether tape is adhered to the document using the transformed image comprises determining whether an area of the transformed image having intensity values exceeding a threshold.

12. The method of claim 10, further comprising:
filtering the transformed image to form a filtered transformed image using a smoothing filter, wherein determining whether tape is adhered to the document using the transformed image comprises determining whether the document includes tape based on the filtered transformed image.

13. The method of claim 10, wherein determining whether tape is adhered to the document using the transformed image comprises:
determining a most frequent intensity value of the transformed image;
offsetting the most frequent intensity value to form an offset most frequent intensity value;
associating one or more portions of the transformed image having respective intensity values greater than the offset most frequent intensity value to a predetermined value; and
determining whether an area of the transformed image portions associated with the predetermined value exceeds a predetermined tape area threshold.

14. The method of claim 13, further comprising:
in response to determining that the area of the transformed image portions associated with the predetermined value exceeds the predetermined tape area threshold, outputting a determination that the document includes tape and outputting a tape area.

15. An apparatus for detecting tape on a document, the apparatus comprising:
a first electromagnetic radiation source to emit a first electromagnetic radiation toward a document;
a second electromagnetic radiation source to emit a second electromagnetic radiation toward the document;
an imaging device to capture a first image and a second image of the document, each of the first image and the second image being captured while electromagnetic radiation from at least one of the first electromagnetic radiation source or the second electromagnetic radiation source is emitted toward the document; and
a controller to compare the first image to the second image to determine whether tape is present on the document;
wherein the first image comprises a first plurality of line images of the document, and wherein the second image comprises a second plurality of line images of the document, and
wherein each line image is an image of a vertically spread line of sight of a segment of the document that is less than a whole of the document.

16. The apparatus of claim 15, further comprising:
a third electromagnetic radiation source to emit a third electromagnetic radiation toward the document;
wherein the imaging device further captures a third image of the document, each of the first image, the second image, and the third image being captured while electromagnetic radiation from at least one of the first electromagnetic radiation source, the second electromagnetic radiation source, or the third electromagnetic radiation source is emitted toward the document; and
wherein the controller compares the first image, the second image, and the third image to determine whether tape is present on the document.

17. The apparatus of claim 15 wherein the first electromagnetic radiation source is an ultraviolet light source to emit ultraviolet light toward the document, and wherein the second electromagnetic radiation source is a first white light source to emit white light toward the document.

18. The apparatus of claim 17, wherein the imaging device is a line scan camera, the line scan camera configured to capture a plurality of line images of the document, each of the plurality of line images being captured while light from one of the ultraviolet light source or the first white light source is emitted toward the document; and
wherein the controller forms an interleaved image using the plurality of line images, the controller further separating the interleaved image into a white light illumination image and an ultraviolet light illumination image, the controller further comparing the white light illumination image to the ultraviolet light illumination image to form a transformed image and determining whether tape is present on the document using the transformed image.

19. The apparatus of claim 18, wherein the first white light source has a first line of sight, and wherein the line scan camera has a second line of sight, the first line of sight forming a first angle with the second line of sight, the apparatus further comprising:
a second white light source to emit white light toward the document, the second white light source having a third line of sight forming a second angle with the second line of sight;
wherein the second angle is greater than the first angle;
wherein each of the plurality of line images is captured while light from one of the ultraviolet light source, the first white light source, or the second white light source is emitted toward the document;
wherein the controller separates the interleaved image into the white light illumination image, the ultraviolet light illumination image, and a specular reflected white light illumination image; and
wherein the controller further compares the white light illumination image, the ultraviolet light illumination image, and the specular reflected white light illumination image to form the transformed image.

* * * * *